US012635020B2

(12) United States Patent
Kamaladinni et al.

(10) Patent No.: US 12,635,020 B2
(45) Date of Patent: May 19, 2026

(54) METHODS AND SYSTEMS FOR MANAGING CONTINUITY OF DATA FLOW IN 5G NETWORKS

(71) Applicant: SAMSUNG ELECTRONICS CO., LTD., Suwon-si (KR)

(72) Inventors: Ravi Pandappa Kamaladinni, Bangalore (IN); Kailash Kumar Jha, Bangalore (IN); Samiran Bhowmik, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 707 days.

(21) Appl. No.: 17/953,189

(22) Filed: Sep. 26, 2022

(65) Prior Publication Data

US 2023/0017455 A1     Jan. 19, 2023

Related U.S. Application Data

(63) Continuation of application No. PCT/KR2021/002700, filed on Mar. 4, 2021.

(30) Foreign Application Priority Data

Mar. 30, 2020    (IN) ............................ 202041013916
Feb. 1, 2021    (IN) ............................ 202041013916

(51) Int. Cl.
*H04W 76/18*        (2018.01)
*H04W 8/00*        (2009.01)
                (Continued)

(52) U.S. Cl.
CPC ........... *H04W 76/18* (2018.02); *H04W 8/005* (2013.01); *H04W 40/248* (2013.01);
                (Continued)

(58) Field of Classification Search
CPC ... H04W 76/18; H04W 8/005; H04W 40/248; H04W 76/36; H04W 48/18; H04W 76/30
See application file for complete search history.

(56) References Cited

U.S. PATENT DOCUMENTS 10,652,942 B2    5/2020   Castellanos Zamora et al.
10,708,824 B2    7/2020   Lee et al.
                (Continued)

FOREIGN PATENT DOCUMENTS

JP        2019-186718        10/2019
KR    10-2018-0123364        11/2018
KR    10-2020-0020544        2/2020

OTHER PUBLICATIONS

3rd Generation Partnership Project; Technical Specification Group; 3GPP TS 24.501 V15.6.0, Dec. 2019, pp. 1-477.
                (Continued)

*Primary Examiner* — Tonia L Dollinger
(74) *Attorney, Agent, or Firm* — NIXON & VANDERHYE P.C.

(57)        ABSTRACT

Methods and/or systems for managing continuity of data flow in 5G networks. A UE may receive a message from a 5G network in response to a PDU session establishment request. The message indicates a failure to establish a PDU session with a first DNN and a first network slice. A PDU session may be established with at least one of a second DNN and a second network slice, if the PDU session is matching with a route selection descriptor applicable to data traffic to be routed through the PDU session. A non-CIoT device may receive a message from a 5G network in response to a service request. The message may indicate failure of a service request procedure, pertaining to a PDU session, such as due to insufficient user-plane resources. The PDU session may be closed and reestablished. If there is (Continued)

lower layer failure in 5G, a connection may be established with a 4G network for data transfer.

15 Claims, 17 Drawing Sheets

(51) Int. Cl.

| | |
|---|---|
| *H04W 40/24* | (2009.01) |
| *H04W 48/18* | (2009.01) |
| *H04W 76/30* | (2018.01) |
| *H04W 76/36* | (2018.01) |

(52) U.S. Cl.
CPC ........... *H04W 48/18* (2013.01); *H04W 76/30* (2018.02); *H04W 76/36* (2018.02)

(56) References Cited

U.S. PATENT DOCUMENTS

| | | | | |
|---|---|---|---|---|
| 2019/0053308 | A1 | 2/2019 | Castellanos Zamora et al. | |
| 2019/0394279 | A1 | 12/2019 | Dao et al. | |
| 2020/0245405 | A1* | 7/2020 | Tang | H04W 40/02 |
| 2021/0092634 | A1* | 3/2021 | Kang | H04L 47/28 |
| 2022/0264683 | A1* | 8/2022 | Liu | H04W 60/04 |

OTHER PUBLICATIONS

3rd Generation Partnership Project; Technical Specification Group and System Aspects; System architecture for the 5G System (5GS), Stage 2, Release 16; 3GPP TS 23.501 V16.4.0, Mar. 27, 2020, pp. 1-419.

* cited by examiner

FIG. 10

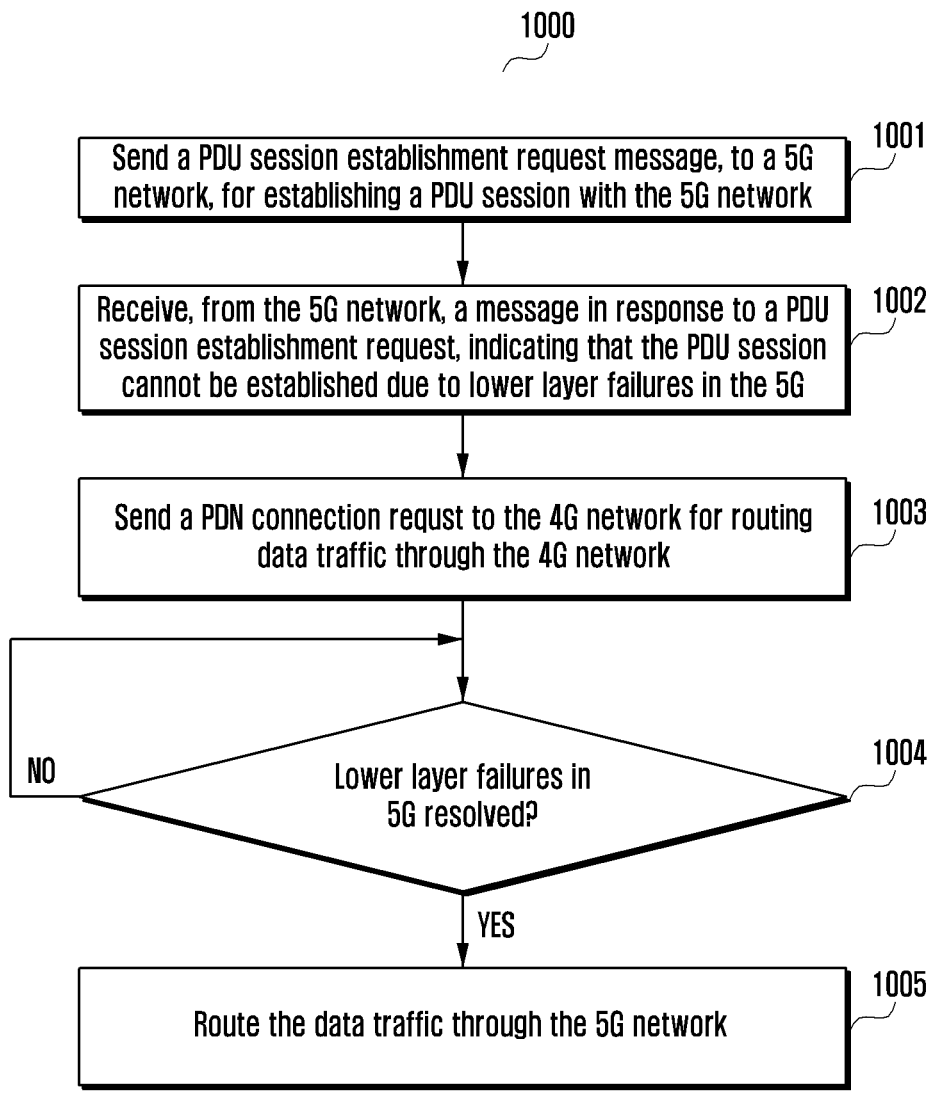

1000

| 1001 | Send a PDU session establishment request message, to a 5G network, for establishing a PDU session with the 5G network |

1002 Receive, from the 5G network, a message in response to a PDU session establishment request, indicating that the PDU session cannot be established due to lower layer failures in the 5G 1003 Send a PDN connection requst to the 4G network for routing data traffic through the 4G network 1004 Lower layer failures in 5G resolved?

NO

YES

1005 Route the data traffic through the 5G network

METHODS AND SYSTEMS FOR MANAGING CONTINUITY OF DATA FLOW IN 5G NETWORKS

CROSS-REFERENCE TO RELATED APPLICATIONS

This application is a continuation of International Application No. PCT/KR2021/002700, filed Mar. 4, 2021, designating the United States, in the Korean Intellectual Property Receiving Office, and claiming priority to Provisional IN Patent Application No. 202041013916 filed Mar. 30, 2020 and to Non-Provisional IN Patent Application No. 202041013916 filed Feb. 1, 2021, the disclosures of which are all hereby incorporated by reference herein in their entireties.

BACKGROUND

Field

Embodiments herein relate to Fifth Generation (5G) communication networks, and more particularly to methods and systems for ensuring data traffic continuity in face of congestion and lower layer failures in the 5G communication networks.

Description of Related Art

If a User Equipment (UE) intents to connect to a Fifth Generation (5G) network (for availing voice or data services), the UE needs to establish a Protocol Data Unit (PDU) session with the 5G network. A PDU session establishment procedure is initiated by the UE, by sending a PDU session establishment request, to the 5G network for establishing the PDU session. If the PDU session cannot be established with the UE, the 5G network sends a PDU session establishment reject message to the UE. The probable causes of failure in establishing the PDU session can be congestion in the 5G network or unavailability of user-plane resources in the 5G network. The 5G network can include a 5G Session Management (5GSM) cause value in a 5GSM Information Element (IE) of the PDU session establishment reject message for indicating the cause of failure in establishing the PDU session. The failure in establishment of the PDU session can also be due to lower layer failures in 5G.

If the PDU session establishment request or if a PDU session modification request fails due to multiple-level congestion in the 5G network, user services can be blocked for a predefined time period, which is set by the 5G network through timers. The time period is included in the PDU session establishment reject message. On receiving the PDU session establishment reject message, the UE refrains from sending further PDU session establishment requests for the predefined time period. This delays the resumption of the PDU session establishment procedure or a PDU session modification procedure. When a PDU session establishment request or if a PDU session modification request fails, due to congestion or inefficient user-plane resources for a PDU session, user services are blocked until the congestion is mitigated or the user-plane resources for the PDU session are restored. When there is lower layer failure, the user services are interrupted until the issues, which are causing the 5G lower layer failure, are resolved.

SUMMARY

Certain example embodiments relate to methods and/or systems for preventing or reducing interruption of user services and ensuring continuity of data traffic, in face of one or more of congestion, insufficient user-plane resources, and lower layer failures, in a Fifth Generation (5G) communication network.

Certain example embodiments relate to detection of congestion in the 5G network based on a Protocol Data Unit (PDU) session establishment reject message, received in response to a PDU session establishment request message with a specific Data Network Name (DNN) and a specific network slice, wherein the PDU session establishment reject message indicates that resources in at least one of the specified DNN and the specified network slice, are not sufficient to establish the PDU session.

Certain example embodiments relate to establishing a PDU session with at least one of a different DNN and a different network slice based on the detected congestion in at least one of the specified DNN and the specified network slice.

Certain example embodiments relate to establishing a Packet Data Network (PDN) connection with a Fourth Generation (4G) network for routing the data traffic through the 4G network and ensuring continuity of the data traffic, if PDU sessions with the all available DNNs and network slices are not matching with at least one route selection descriptor applicable to the data traffic.

Certain example embodiments relate to establishing a PDU session with a high priority DNN and a high priority network slice, while the data traffic is seamlessly routed either through a PDU session established with a low priority DNN and a low priority network slice or the 4G network.

Certain example embodiments relate to the reestablishment of a PDU session if a service request procedure pertaining to the PDU session fails due to insufficient user-plane resources for the PDU session, wherein the PDU session can be reestablished if the user-plane resources are allocated.

Certain example embodiments relate to establishing another PDU session if user-plane resources are not allocated to the PDU session, wherein the PDU session is established with a DNN and a network slice that is matching with at least one route selection descriptor applicable to the data traffic.

Certain example embodiments relate to establishing a PDN connection with the 4G network for ensuring continuity of the data traffic, if PDU sessions cannot be established for routing the data traffic through the 5G network due to insufficient user-plane resources in the 5G network.

Certain example embodiments relate to establishing a PDN connection with the 4G network for routing the data traffic, for ensuring continuity of the data traffic, if lower layer failure is detected in the 5G network.

Certain example embodiments may include receiving a Protocol Data Unit (PDU) session establishment reject message, from a 5G network in response to a PDU session establishment request, wherein the message indicates a failure to establish a PDU session with at least one of a first Data Network Name (DNN) and a first network slice. The embodiments include establishing, by the UE, a PDU session with at least one of a second DNN and a second network slice, if the PDU session is matching with at least one route selection descriptor that is applicable to data traffic to be routed through the PDU session. If a PDU session is not established with the 5G network, the embodiments include establishing a Packet Data Network (PDN) connection with an Evolved Packet Core (EPC) for routing the data traffic. The 5G PDU sessions are not matching with the the at least one route selection descriptor applicable to the data traffic to be routed through the 5G PDU sessions.

In an example embodiment, the UE attempts to establish a PDU session with at least one of the first DNN and the first network slice after the expiry of a timer, included in the received PDU session establishment reject message, and closing the PDU session with at least one of the second DNN and the second network slice or the PDN session with the EPC; if the PDU session with at least one of the first DNN and the first network slice is established.

Example embodiments (e.g., non-Cellular Internet of Things (CIoT) devices) include sending a service request message for reactivating user-plane resources pertaining to a PDU session. The service request message may be sent to the 5G network. If the 5G network is not having sufficient user-plane resources for reactivating the user-plane resources, then the 5G network sends a Service Accept message. The Service Accept message indicates a failure of the service request procedure. The cause of failure of the service request procedure is insufficient user-plane resources. Example embodiments include closing the PDU session and re-establishing the PDU session. The embodiments include sending a PDU session establishment request to the 5G network. If the PDU session establishment request is successful, the PDU session may be re-established with different user-plane resources. The 5G network indicates that the success of the PDU session establishment request by sending a PDU session establishment accept message to the UE 601. If the PDU session establishment request is not successful, the UE 601 can attempt to establish PDU sessions with different combinations of available DNNs and network slices. If the UE 601 is not able to establish a PDU session with the 5G network, the UE 601 can send a PDN connectivity request to the EPC for establishing a PDN session for routing data traffic using user-plane resources of the EPC.

Example embodiments (e.g., CIoT devices) may include periodically sending service requests to the 5G network for reactivating the user-plane resources pertaining to the PDU session.

Example embodiments may include sending a PDU session Establishment Request, or a PDU session Modification Request to the 5G network. If there is a lower layer failure in 5G, the UE 601 can detect the lower layer failure during Radio Resource Control (RRC) connection establishment, which is mandatory for sending the PDU session establishment Request or PDU session Modification Request message to the 5G network 602. The embodiments include sending a PDN connectivity request message to the EPC. If the EPC accepts the PDN connectivity request, the EPC can send a PDN connectivity accept message. The UE 603 can route data traffic to the EPC.

Accordingly, example embodiments may provide methods and/or systems for managing continuity of data traffic, in a User Equipment (UE), for preventing, or reducing the likelihood of, user service interruptions due to congestions, insufficient user-plane resources, and/or lower layer failures in a Fifth Generation (5G) network.

BRIEF DESCRIPTION OF DRAWINGS

The above and other aspects, features, and advantages of certain embodiments will be more apparent from the following detailed description, taken in conjunction with the accompanying drawings, in which:

FIG. 10 is a flowchart depicting a method for preventing or reducing interruptions in user service due to lower layer failure in the 5G network, according to example embodiments;

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
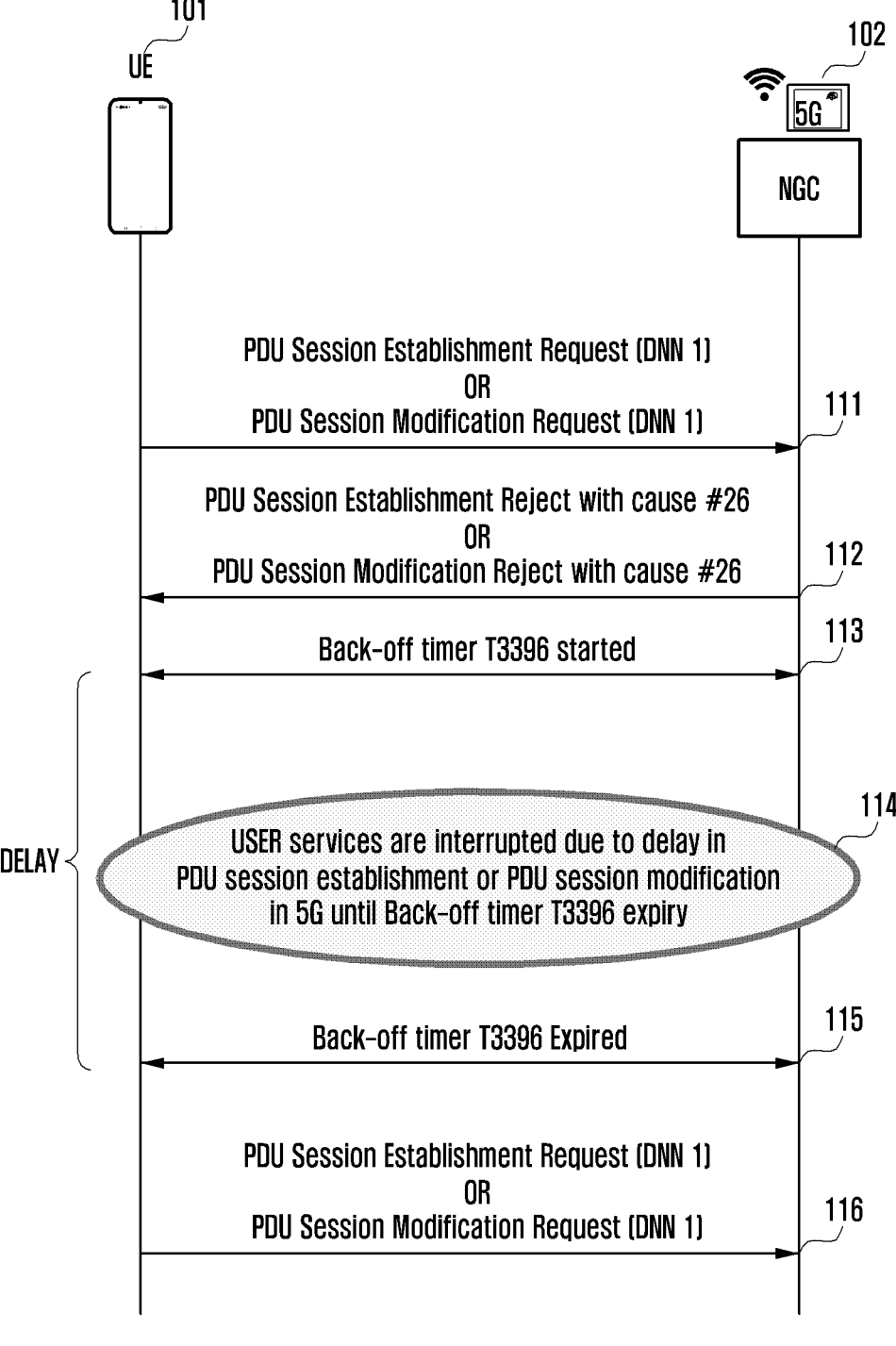
FIG. 1 is a sequence diagram depicting a delayed establishment of a Protocol Data Unit (PDU) session, which had initially failed due to congestion in a Fifth Generation (5G) network.

FIG. 1 is a sequence diagram depicting a delayed establishment of a PDU session, which had initially failed due to congestion in the 5G network. As depicted in FIG. 1, initially, the UE 101, in process 111, sends a PDU session Establishment Request, or a PDU session Modification Request, through a Data Network Name (DNN)-1, to the 5G (New Radio Core (NGC)) network 102. Consider that the DNN-1 is congested. Therefore, the 5G network 102, in process 112, sends a PDU session Establishment Reject message or a PDU session Modification Reject message as a response. The PDU session Establishment Reject message or the PDU session Modification Reject message includes the 5GSM cause value #26 with a back-off timer T3396. The 5G network 102, in process 113, initializes the T3396 timer to prevent, or reduce the likelihood of, the UE 101 from sending another PDU session Establishment Request, or another PDU session Modification Request prior to the expiry of the timer T3396. Once the T3396 timer expires (process 115), the UE 101, in process 116, can resend the PDU session Establishment Request, or the PDU session Modification Request to the 5G network 102. The user services are interrupted due to the delay in PDU session establishment or PDU session modification, caused by the timer T3396 (process 114).

Figure 2:
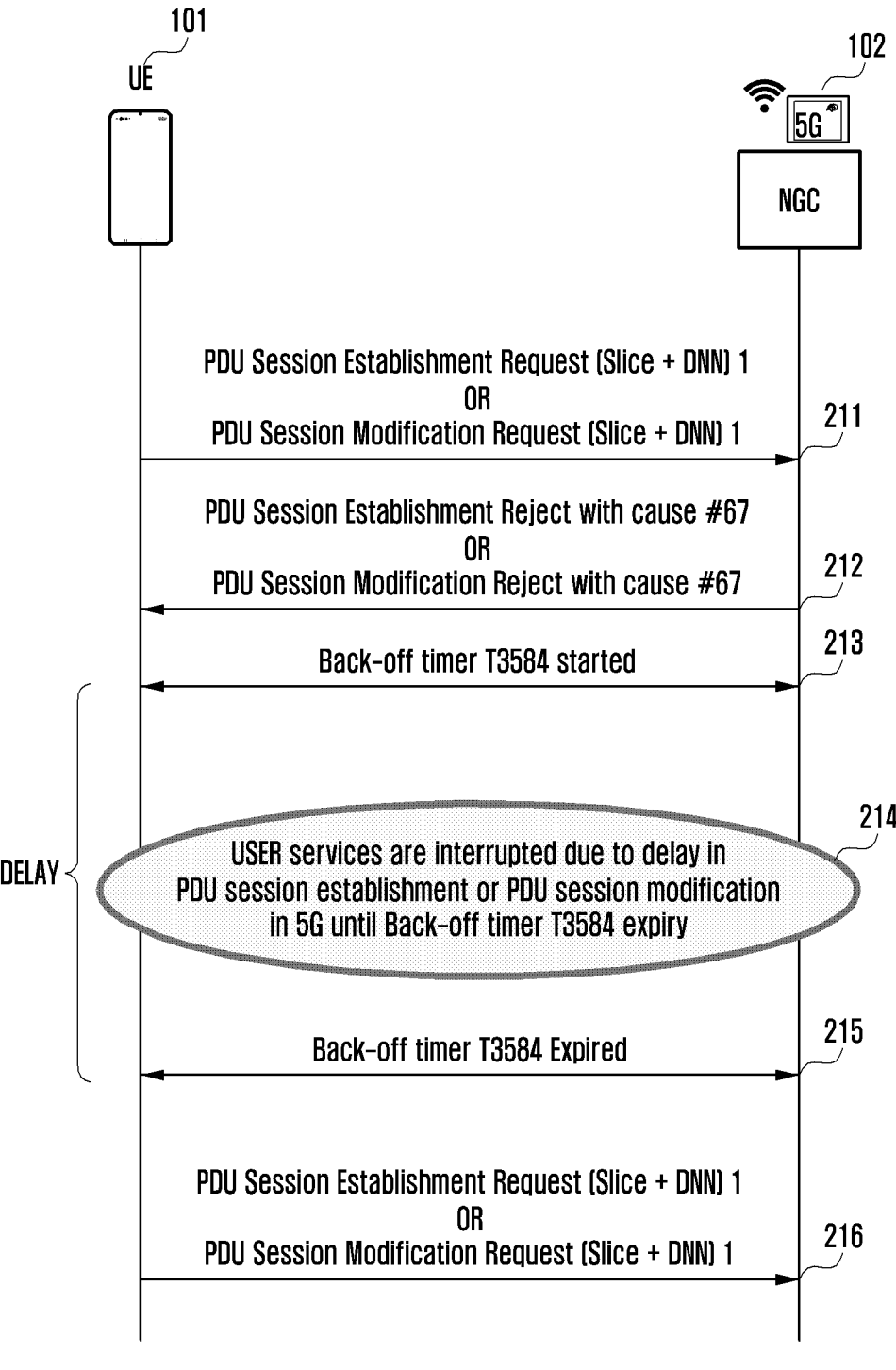
FIG. 2 is another sequence diagram depicting a delayed establishment of a PDU session, which had initially failed due to congestion in the 5G network.

FIG. 2 is another sequence diagram depicting a delayed establishment of a PDU session, which had initially failed due to congestion in the 5G network. The congestion is caused due to insufficient resources in the 5G network 102, which prevents or reduces the likelihood of establishing the PDU session with a specific DNN and a specific network slice. As depicted in FIG. 2, the UE 101, in process 211, sends a PDU session Establishment Request, or a PDU session Modification Request, through DNN-1 and network slice-1, to the 5G (NGC) network 102. If there is congestion in DNN-1 and network slice-1, the 5G network 102, in process 212, sends, to the UE 101, a PDU session Establishment Reject message or a PDU session Modification Reject message. The PDU session Establishment Reject message or PDU session Modification Reject message includes the 5GSM cause value #67 with a back-off timer T3584. The 5G network 102, in process 213, initializes the T3584 timer to prevent or reduce the likelihood of the UE from sending another PDU session Establishment Request, or another PDU session Modification Request with the DNN-1 and the network slice-1, prior to the expiry of the timer T3584. Once the T3584 timer expires (process 215), the UE 101, in process 216, can resend PDU session Establishment Request, or PDU session Modification Request to the 5G network 102. Thus, the user services remain interrupted until the T3584 timer expires (process 214).

Figure 3:
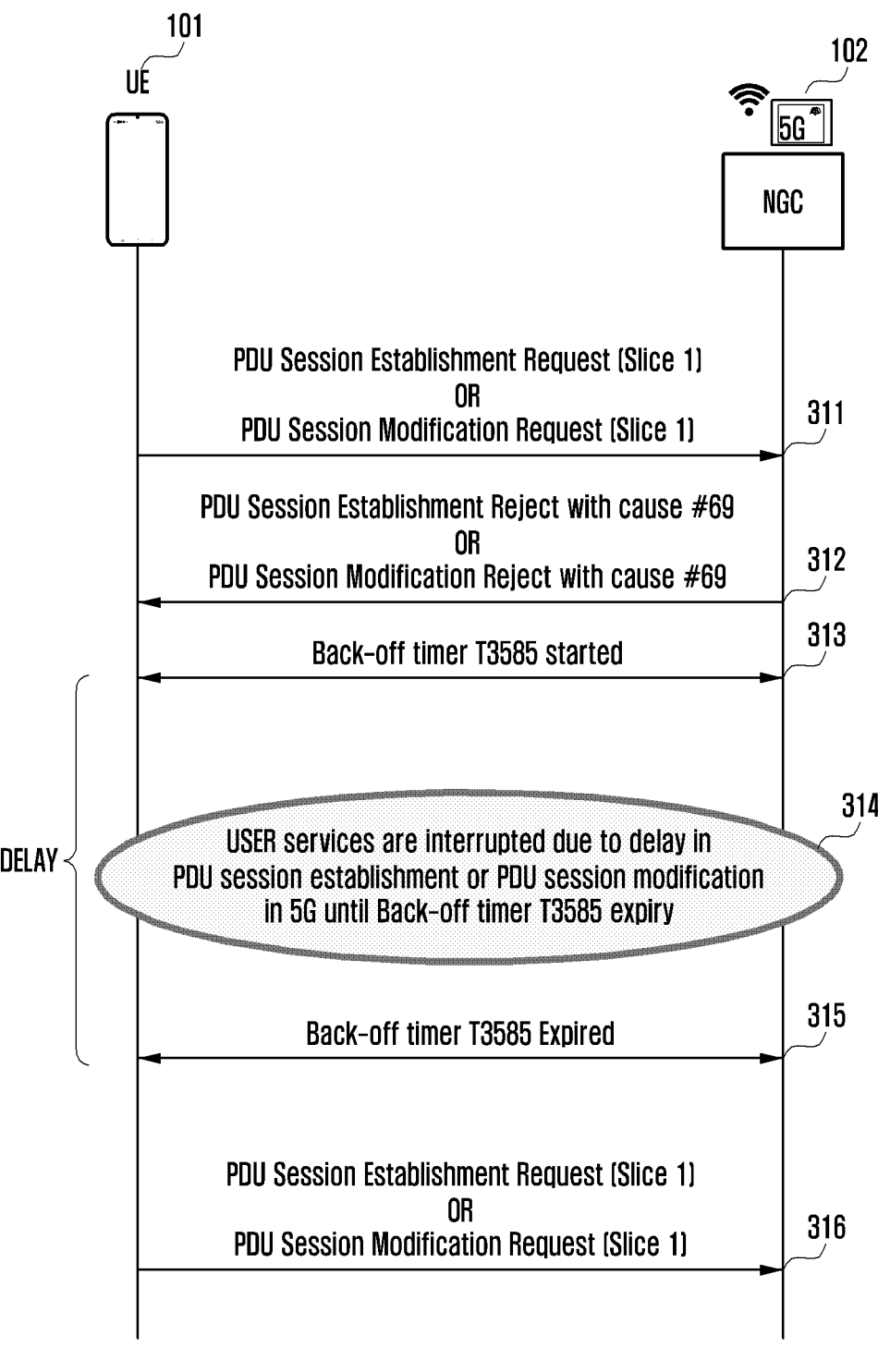
FIG. 3 is yet another sequence diagram depicting a delayed establishment of a PDU session, which had initially failed due to congestion in the 5G network.

FIG. 3 is yet another sequence diagram depicting a delayed establishment of a PDU session, which had initially failed due to congestion in the 5G network. The congestion in the 5G network 102 prevents or reduces the likelihood of establishing the PDU session with a specific network slice. As depicted in FIG. 3, the UE 101, in process 311, sends a PDU session Establishment Request, or a PDU session Modification Request, through a particular DNN and a network slice-1, to the 5G (NGC) network 102. If there is congestion in the network slice-1, the 5G network 102, in process 312, sends, to the UE, a PDU session Establishment Reject message or a PDU session Modification Reject message. The PDU session Establishment Reject message or PDU session Modification Reject message includes the 5GSM cause value #69 with a back-off timer T3585. The 5G network 102, in process 313, initializes the T3585 timer to prevent or reduce the likelihood of the UE 101 from sending another PDU session Establishment Request, or another PDU session Modification Request with the network slice-1, prior to the expiry of the timer T3585. Once the T3585 timer expires (process 315), the UE 101, in process 316, can resend the PDU session Establishment Request, or the PDU session Modification Request to the 5G network 102. Thus, the user services remain interrupted till the T3585 timer expires and if the congestion in network slice-1 is mitigated (process 314).

Figure 4:
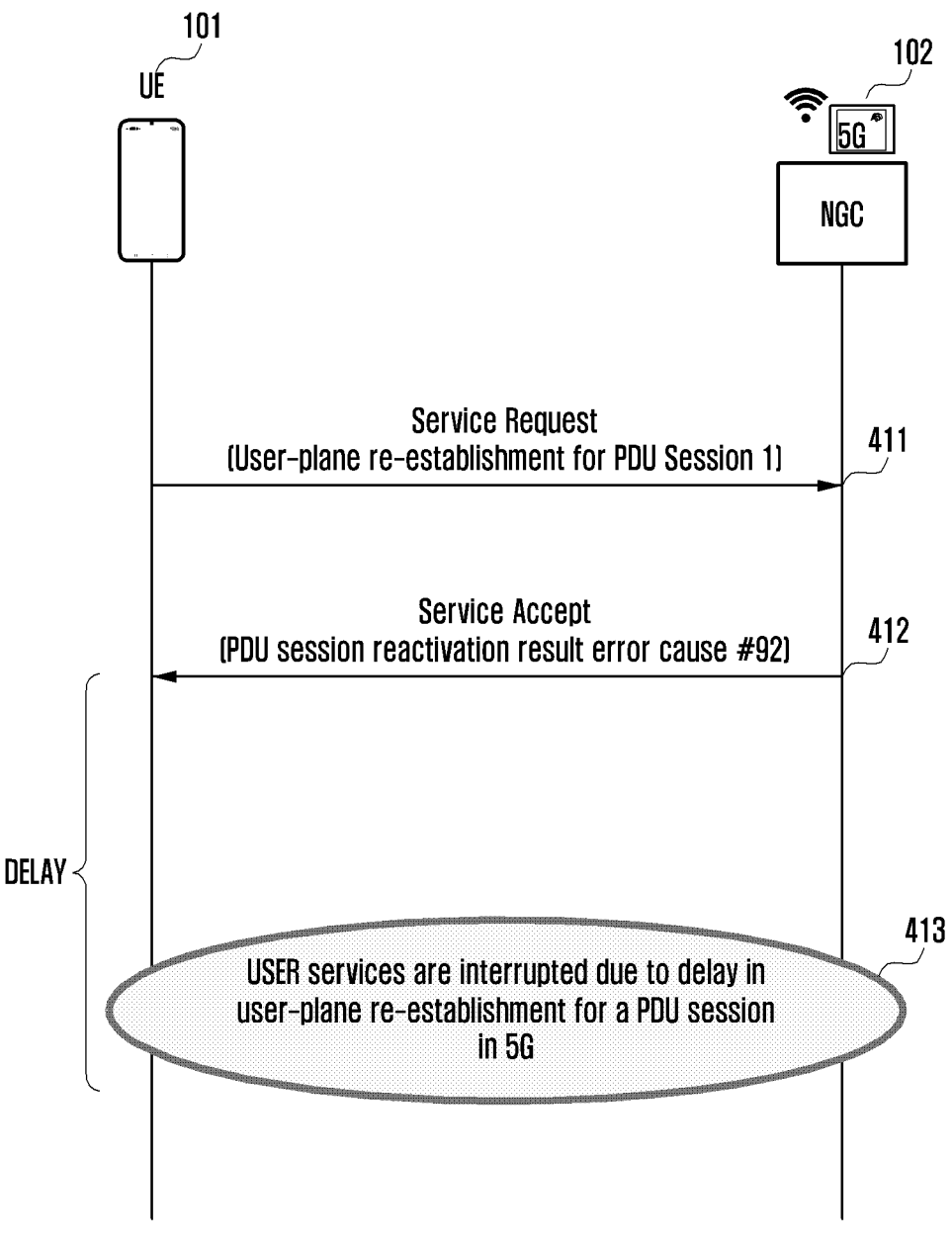
FIG. 4 is a sequence diagram depicting interruption in user services due to failure of a service request procedure.

FIG. 4 is a sequence diagram depicting interruption in user services due to failure of a service request procedure. The service request pertains to an established PDU session and the cause of failure of the service request procedure is insufficient user-plane resources in the 5G network 102. As depicted in FIG. 4, consider that a UE 101, in process 411, sends a service request for a user-plane reestablishment. The service request message is received by the 5G (NGC) network 102. If the 5G network is not having sufficient user-plane resources for user-plane reestablishment or user-plane reactivation, then the 5G network 102, in process 412, sends, to the UE 101, a service accept message, wherein the service accept message includes the 5G Mobility Management (5GMM) cause value #92 (user-plane resources for PDU session is not sufficient). Based on specific implementation of the UE 101, the UE 101 can send service requests to the 5G network 102. When the 5G network 102 is having sufficient user-plane resources, the user services for the PDU session can be restored. Thus, the user services remain interrupted due to a delay in user-plane resource allocation for the PDU session in 5G (process 413).

Figure 5:
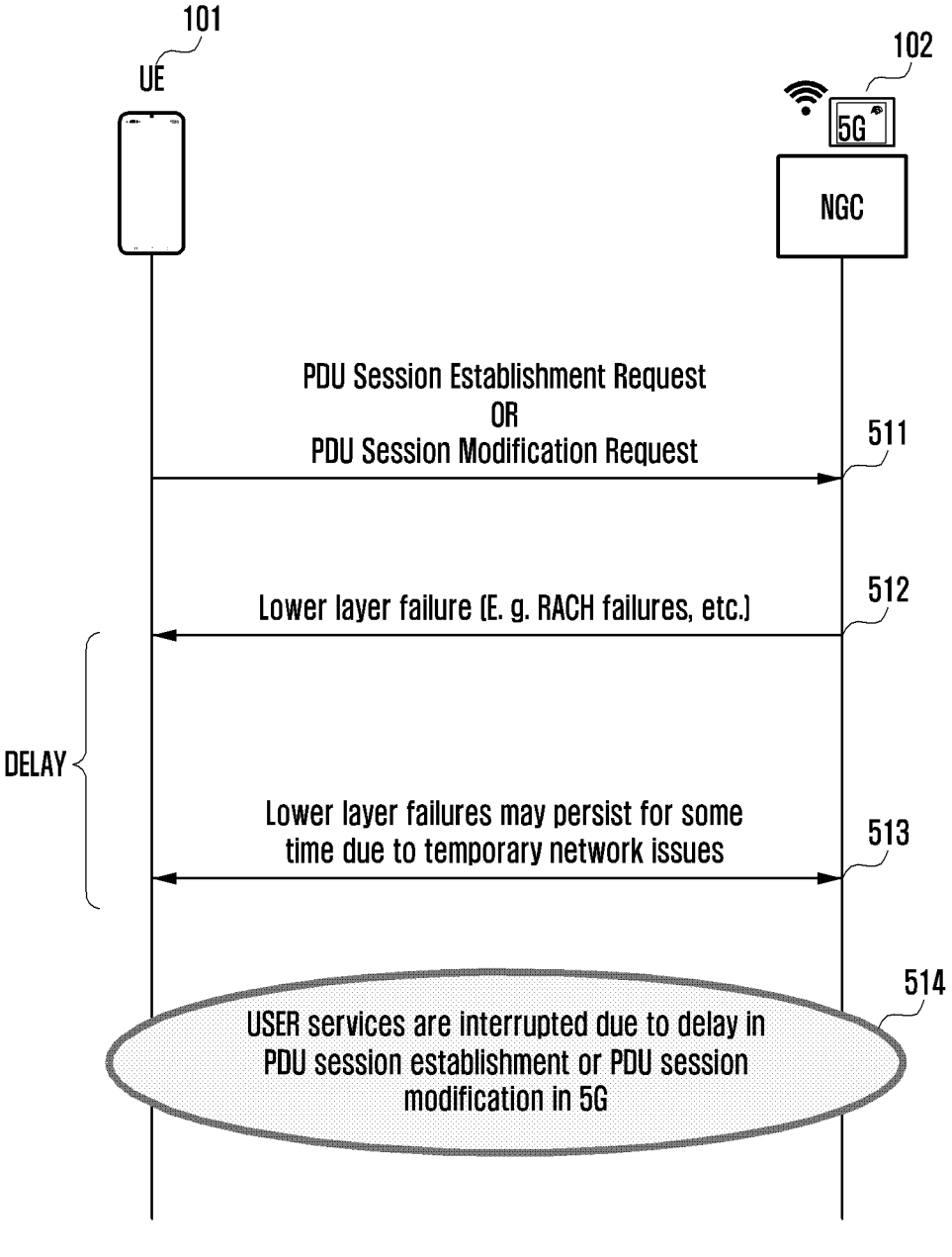
FIG. 5 is a sequence diagram depicting a failure in establishing a PDU session due to 5G lower layer failure.

FIG. 5 is a sequence diagram depicting a failure in establishing a PDU session due to 5G lower layer failure. The lower layer failure in 5G prevents or reduces the likelihood of establishing the PDU session with a particular DNN or a particular network slice, causing interruption in the delivery of user services. As depicted in FIG. 5, the UE 101, in process 511, sends a PDU session Establishment Request, or a PDU session Modification Request to the 5G (NGC) network 102. If there is a lower layer failure in 5G, then the PDU session Establishment Request fails (process 512). The lower layer failure can be a Random Access Channel (RACH) failure, poor channel conditions, poor Reference Signal Received Power (RSRP), and so on. The lower layer failure may persist for an indefinite time period. Correspondingly, the user services are interrupted for the indefinite time period, and can be restored once the lower layer failure is resolved (513, 514). Meanwhile, the PDU sessions cannot be established. Currently, the 3rd Generation Partnership Project (3GPP) does not define retry mechanisms for dealing with the lower layer failures encountered during the PDU session Establishment or the PDU session Modification procedures.

Embodiments herein disclose methods and systems for preventing or reducing interruption of user services and ensuring continuity of data traffic, in face of congestion, insufficient user-plane resources, and lower layer failures, in a Fifth Generation (5G) communication network. The embodiments include detecting congestion in the 5G network based on PDU session establishment reject messages, which are received in response to PDU session establishment request messages with specific Data Network Names (DNNs) and specific network slices. The PDU session establishment reject messages can indicate that resources in at least one of the DNNs and the network slices, specified in the PDU session establishment request messages, are not sufficient to establish the PDU session.

The embodiments include establishing a PDU session with at least one of a different DNN and a different network slice, on the detecting congestion in at least one of the DNNs and the network slices specified in the PDU session establishment request messages. If PDU sessions cannot be established with the 5G network, the embodiments include establishing a Packet Data Network (PDN) connection with a Fourth Generation (4G) network for routing the data traffic through the 4G network and ensuring the continuity of the data traffic. The embodiments include establishing a PDU session with a high priority DNN and a high priority network slice, while the data traffic is seamlessly transferred through either a PDU session established with a low priority DNN and a low priority network slice or the 4G network.

The embodiments herein include reestablishing a PDU session if a service request procedure pertaining to a PDU session fails due to insufficient user-plane resources for the PDU session. The PDU session is a high priority PDU, and can be reestablished if the user-plane resources are allocated. The embodiments include establishing another PDU session of lower priority, if user-plane resources are not allocated for the high priority PDU session, wherein the low priority PDU session is established with a DNN and a network slice that is matching with at least one route selection descriptor applicable to the data traffic. If PDU sessions cannot be established with the 5G network, the embodiments include establishing a PDN connection with the 4G network for ensuring continuity of the data traffic. The embodiments include reestablishing the high priority PDU session, while the data traffic is seamlessly routed through either a low priority PDU session or the 4G network.

The embodiments herein include establishing a PDN connection with the 4G network for routing the data traffic and ensuring the continuity of the data traffic, on detecting a lower layer failure in the 5G network. The embodiments herein include routing the data traffic through the 5G network after the lower layer failure is resolved.

Referring now to the drawings, and more particularly to FIGS. 6 through 15, where similar reference characters denote corresponding features consistently throughout the figures, there are shown preferred embodiments.

Figure 6:
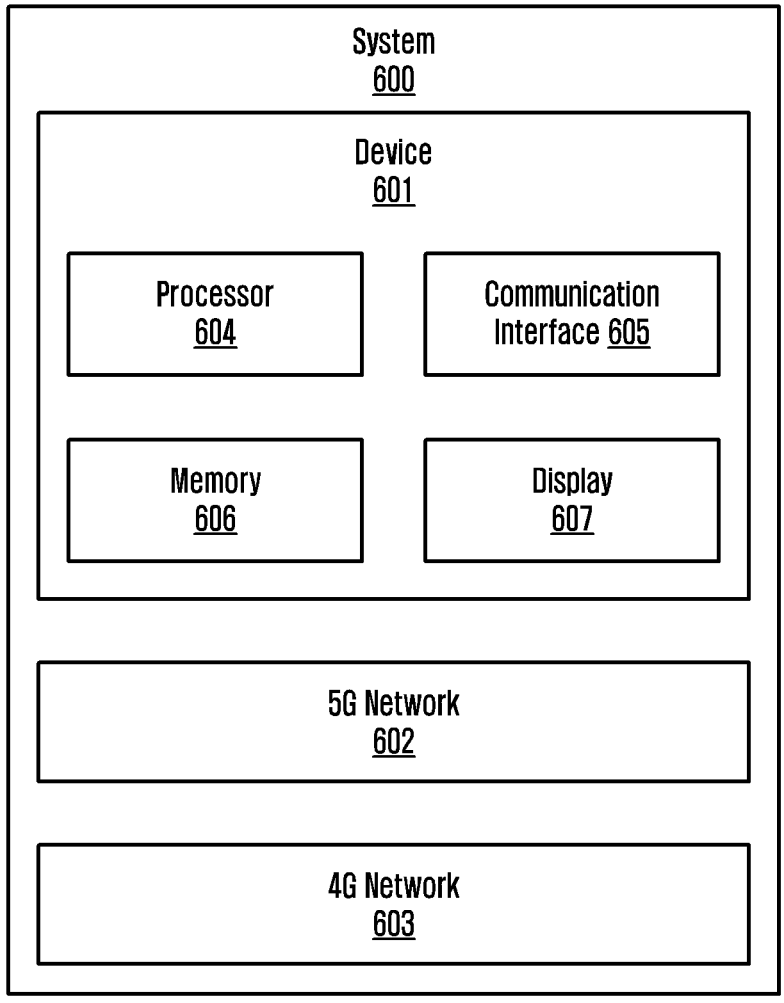
FIG. 6 depicts a system comprising a device, a 5G network, and a Fourth Generation (4G) network, wherein the device is configured to manage continuity of data traffic from/to the device, according to example embodiments.

FIG. 6 depicts a system 600 comprising a device 601, a 5G network 602, and a 4G network 603, wherein the device 601 is configured to manage continuity of data traffic from/to the device 601, according to example embodiments. Consider that the device 601 is initially connected to the 5G network 602. In an embodiment, the 5G network 602 includes a Next Generation Node B (gNB) and a Next Generation Core (NGC). In an embodiment, the 4G network 603 includes an evolved Node B (eNB) and an Evolved Packet Core (EPC). As depicted in FIG. 6, the device 601 comprises of a processor 604, a communication interface 605, a memory 606, and a display 607.

In a first embodiment; consider that the device 601 is a User Equipment (UE), which is registered with the 5G network 602 and the 4G network 603. The processor 604 of the UE 601 can send a Protocol Data Unit (PDU) session establishment request message to the 5G network 602 using the communication interface 605. The processor 604 can indicate, to the 5G network 602, that the UE 601 intends to establish a PDU session with a first Data Network Name (DNN) and a first network slice. The processor 604 can refer URSP (UE Route Selection Policy) rule stored in the memory 606. The URSP rule may include information for establishing the PDU session. The URSP rule may include information related to operation policy of the PDU session.

The URSP rule may include information related to DNN (including a first DNN and a second DNN) and S-NSSAI (network slice selection assistance information) (including a first S-NSSAI and a second S-NSSAI). The information related to the DNN can be included in Route Selection Descriptor (RSD) in the URSP rule and the information related to the S-NSSAI can be included in the Route Selection Descriptor (RSD). The RSD may include information related to at least one or more DNN and S-NSSAI. For example, the RSD may include a priority order of each of the at least one or more DNN and the RSD may include a priority order of each of the at least one or more S-NSSAI. The processor 604 can include the first DNN and the first network slice in the PDU session establishment request message. The PDU session with the first DNN and the first network slice match with at least one route selection descriptor applicable to the data traffic to be routed through the PDU sessions. The 5G network 602 can send a PDU session establishment reject message on receiving the PDU session. The 5G network 602 can send the PDU session establishment reject message if there is insufficient resources in the first DNN and/or the first network slice.

The UE 601 can receive, through the communication interface 605, the PDU session establishment reject message as a response to the PDU session establishment request. The processor 604 can determine that the PDU session establishment procedure has failed due to insufficient resources in the first DNN and/or the first network slice. The PDU session establishment reject message can include a cause of the failure and a timer value. The processor 604 can refrain from sending another PDU session establishment procedure with the first DNN and the first network slice prior to the expiry of the timer. The processor 604 can send a PDU session establishment request with at least one of a second DNN and a second network slice, prior to the expiry of the timer. The PDU sessions associated with the second DNN and the second network slice match with at least one route selection descriptor applicable to the data traffic to be routed through the PDU sessions. The route selection descriptor includes, but not limited to, route selection descriptor precedence, SSC mode selection, network slice selection, DNN selection, PDU session type selection, non-seamless offload indication, access type preference, route selection validation criteria, time window, and location criteria.

If the PDU session establishment procedure fails due to insufficient resources in the first DNN, the processor 604 can send a PDU session establishment request for establishing a PDU session with the second DNN and the first network slice. If the PDU session establishment procedure fails due to insufficient resources in the first DNN and insufficient resources in the first network slice, the processor 604 can send a PDU session establishment request for establishing a PDU session with the second DNN and the second network slice. If the PDU session establishment procedure fails due to insufficient resources in the first network slice, the processor 604 can send a PDU session establishment request for establishing a PDU session with the first DNN and the second network slice.

When the processor 604 detects that the timer, included in the received PDU session establishment reject message, has expired, the processor 604 attempts to establish a PDU session with the first DNN and the first network slice. The first DNN, the first network slice, the second DNN and the second network slice, can be associated with priorities. The priority associated with the first DNN is greater than the priority associated with the second DNN. The priority associated with the first network slice is greater than the priority associated with the second network slice. Therefore, the processor 604 attempts to establish a PDU session with the first DNN and the first network slice by resending the PDU session establishment request with the first DNN and the first network slice after the expiry of the timer. The embodiments continue to transmit PDU session establishment requests periodically, if the previous PDU session establishment requests fail. If a PDU session establishment request is successful, the processor 604 can close the PDU session with at least one of the second DNN and the second network slice.

If the processor 604 is not able to establish a PDU session with at least one of the first DNN, the second DNN, the first network slice, and the second network slice, the processor 604 can send a PDN connection request to the 4G network 603. The processor 604 can send the PDN connection request to the 4G network 603 prior to the expiry of the timer. The DNNs and the network slices associated with the PDU sessions of the 5G network 602 may not match with the at least one route selection descriptor applicable to the data traffic. Therefore, the processor 604 attempts to establish the PDN connection with the 4G network 603 to ensure the continuity of the flow of the data traffic to/from the UE 601.

When the processor 604 is connected to the 4G network 603, and detects that the timer has expired, the processor 604 attempts to establish a PDU session with the first DNN and the first network slice due to the high priority of the first DNN and the high priority of the first network slice. The connections of the UE 601 with the 5G network 602 and the 4G network 603 are associated with priorities. The priority can be set automatically or manually. If the priority of 5G network connectivity is set greater than the priority of 4G network connectivity, the embodiments include transmitting a PDU session establishment request with the first DNN and the first network slice. The processor 604 can periodically send PDU session establishment requests, if the previous PDU session establishment requests fail. If a PDU session establishment request is successful, the processor 604 can close the PDN connection.

In a second embodiment, consider that the device 601 is a non-Cellular Internet of Things (CIoT) device. The processor 604 can send a service request message, pertaining to a PDU session, to the 5G network 602. The non-CIoT device can be a UE 601. Consider that the PDU session is having the highest priority for routing the data traffic, and the PDU session is matching with the at least one route selection descriptor applicable to the data traffic. The processor 604 sends the service request message when the UE 601 intends to reactivate user-plane resources pertaining to the high priority PDU session, for reestablishing the high priority PDU session. The communication interface 605 of the UE 601 may receive, from the 5G network 502, a service accept message in response to the service request message, which indicates that the service request procedure has failed. The Service Accept message can include a cause of the failure in reactivating the PDU session. The cause can be insufficient user-plane resources for the high priority PDU session, which can be indicated by the 5G network 602 through a cause value included in the service accept message.

The processor 604, on determining the failure of the service request procedure based on the service accept message, can close the high priority PDU session. The processor 604 can attempt to reestablish the high priority PDU session. The attempt of the processor 604 is based on the possibility of the 5G network 602 (Session Management Function (SMF)) allocating a non-congested User-Plane Function (UPF). If the UE 601 is not able to obtain the necessary user-plane resources for reestablishing the high priority PDU session with the 5G network 602, the processor 604 can send a PDU session establishment request, to the 5G network 602, for establishing a PDU session with a low priority DNN and a low priority network slice. It can be noted that the high priority PDU sessions and the low priority PDU sessions match with the at least one route selection descriptor applicable to the data traffic to be routed through the PDU sessions. If the UE 601 is not able to establish a low priority PDU session with the 5G network 602, the processor 604 can send a PDN connection request to the 4G network 603 for connecting to the 4G network 603 for routing the data traffic.

The processor 604 attempts to establish the high priority PDU session, which was closed due to the failure of the service request procedure associated with the high priority PDU session. The processor 604 attempts to establish the high priority PDU session while the UE 601 is routing the data traffic using the low priority PDU session or the PDN connection. The processor 604 sends a PDU session establishment request for establishing the high priority PDU session. The processor 604 can periodically send PDU session establishment requests, if the previous PDU session establishment requests fail.

The processor 604 can initialize a timer, which expires after a predefined time period. The processor 604 sends the PDU session establishment requests after the expiry of the timer. When a PDU session establishment request procedure fails, the processor 604 increments and restarts the timer, and sends another PDU session establishment request to the 5G network 602. If the number of failures increases such that a value of the timer is greater than a predefined threshold, the processor 604 can increase a time interval, controlling the expiry of the timer, beyond the predefined time period. When the PDU session establishment request is successful, the processor 604 can either close the low priority PDU session or close the PDN connection with the 4G network 603.

If the device 601 is a CIoT device, the processor 604 can initialize a timer, which expires after a predefined time period. When the service request procedure pertaining to the high priority PDU session fails, the processor 604 initializes the timer. The processor 604 can send a service request message to the 5G network 602 after the expiry of the timer (predefined time period). When a service request procedure fails, the processor 604 increments and restarts the timer, and sends another service request message. If the number of service request failures increases such that a value of the timer is greater than a predefined threshold, the processor 604 can increase a time interval, controlling the expiry of the timer, beyond the predefined time period. When the service request is successful and user-plane resources pertaining to the PDU session have been allocated (user-plane resources for the high priority PDU session are reestablished and the high priority PDU session is reactivated), the processor 604 can discard the timer.

In a third embodiment, consider that the device 601 is a UE. The processor 604 of the UE 601 can send a PDU session establishment request message to the 5G network 602 for establishing a PDU session with the 5G network 602. The UE 601 can determine that PDU session cannot be established due to lower layer failures in the 5G network 602. The processor 604 can send a PDN connection request to the 4G network 603 to connect with the 4G network 603 for routing the data traffic through the 4G network 603 and ensure the continuity of the flow of the data traffic. Once the PDN connection is established, the processor 604 can route the data traffic uninterruptedly through the 4G network 603. Once the lower layer failure in the 5G network 602 is resolved, the processor 604 can resume the data traffic through the 5G network 602 by successfully establishing a PDU session with the 5G network 602.

FIG. 6 shows exemplary units of the system 600, but it is to be understood that other embodiments are not limited thereon. In other embodiments, the system 600 may include less or more number of units. Further, the labels or names of the units of the system 600 are used only for illustrative purpose and does not limit the scope. One or more units can be combined together to perform same or substantially similar function in the system 600.

Figure 7:
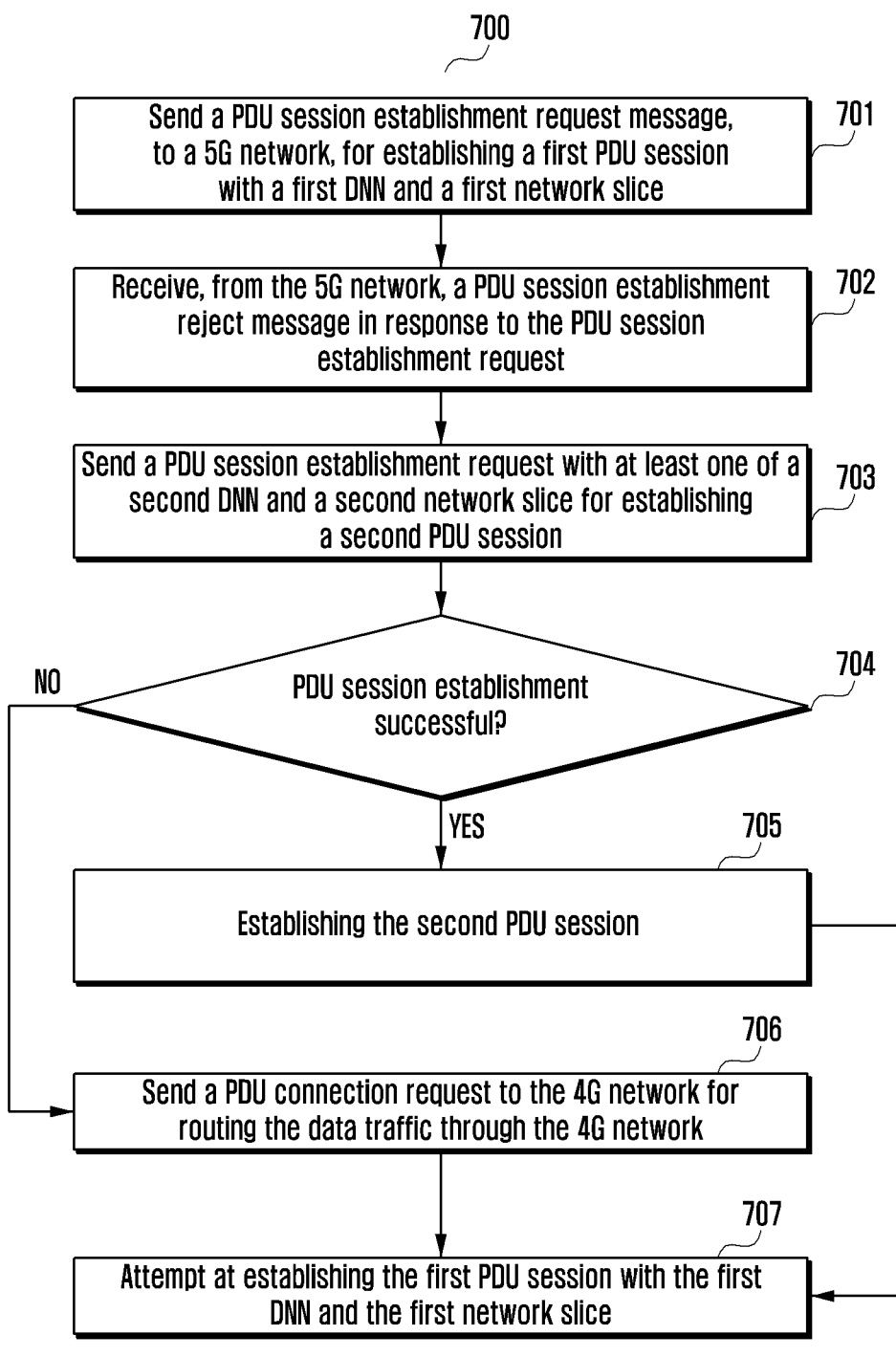
FIG. 7 is a flowchart depicting a method for preventing or reducing interruptions in user service due to issues in the 5G network, and ensuring continuity of data traffic, according to example embodiments.

FIG. 7 is a flowchart 700 depicting a method for preventing or reducing interruptions in user service due to issues in the 5G network 602, and ensuring continuity of data traffic, according to example embodiments. At step 701, the method includes sending a PDU session establishment request message, to the 5G network 602, for establishing a first PDU session with a first DNN and a first network slice. The embodiments include sending the PDU session establishment request to indicate that the UE 601 intends to establish the first PDU session with the 5G network 602 using the first DNN and the first network slice.

At step 702, the method includes receiving, from the 5G network 602, a PDU session establishment reject message in response to the PDU session establishment request. The PDU session establishment reject message indicates failure of the PDU session establishment procedure. In an embodiment, the PDU session establishment reject message can include a cause of the failure and a timer value. In an embodiment, the cause of the failure can be due to insufficient resources in at least one of the first DNN and the first network slice. The embodiments include refraining from transmitting another PDU session establishment with the first DNN and the first network slice procedure prior to the expiry of the timer.

At step 703, the method includes sending a PDU session establishment request with at least one of a second DNN and a second network slice for establishing a second PDU session. The embodiments include sending the PDU session establishment request prior to the expiry of the timer, included in the received PDU session establishment reject message. At step 704, the method includes determining if the PDU session establishment request is successful. If the PDU session establishment request is successful, the method includes, at step 705, establishing the second PDU session. If the establishment of the first PDU session had failed due to insufficient resources in the first DNN, the embodiments include attempting at establishing the second PDU session with the second DNN and the first network slice. If the establishment of the first PDU session had failed due to insufficient resources in the first DNN and insufficient resources in the first network slice, the embodiments include attempting at establishing the second PDU session with the second DNN and the second network slice. If the establishment of the first PDU session had failed due insufficient resources in the first network slice, the embodiments include attempting at establishing the second PDU session with the first DNN and the second network slice. The PDU sessions associated with the first DNN, the first network slice, the second DNN and the second network slice, match with at least one route selection descriptor applicable to the data traffic to be routed through the PDU sessions.

If the second PDU session establishment request is not successful, the method includes, at step 706, sending a PDN connection request to the 4G network 603 for routing the data traffic through the 4G network 603. If PDU sessions cannot be established with at least one of the first DNN, the first network slice, the second DNN and the second network slice, the embodiments include establishing the PDN connection. The embodiments include sending the PDN connection request to the 4G network 603 prior to the expiry of the timer. The PDU sessions with at least one the first DNN, the second DNN, the first network slice, and the second network slice may not match with at least one route selection descriptor applicable to the data traffic.

At step 707, the method includes attempting to establish the first PDU session with the first DNN and the first network slice after the expiry of the timer. The DNNs and the network slices can be associated with priorities. The priority associated with the first DNN is greater than the priority associated with the second DNN. Similarly, the priority associated with the first network slice is greater than the priority associated with the second network slice. Therefore, the embodiments include transmitting a PDU session establishment request with the first DNN and the first network slice after the expiry of the timer. The embodiments continue to transmit PDU session establishment requests periodically, if the previous PDU session establishment requests fail. If a PDU session establishment request is successful, the embodiments disconnect the second PDU session with at least one of the second DNN and the second network slice.

The embodiments include prioritizing connectivity to the 5G network 602 and the 4G network 603. In an embodiment, the priority of 5G network connectivity is greater than the priority of 4G network connectivity. Therefore, the embodiments include sending the PDU session establishment request with the first DNN and the first network slice after the expiry of the timer while the data traffic is seamlessly through the 4G network 603.

The various actions in the flowchart 700 may be performed in the order presented, in a different order, or simultaneously. Further, in some embodiments, some actions listed in FIG. 7 may be omitted.

Figure 8A:
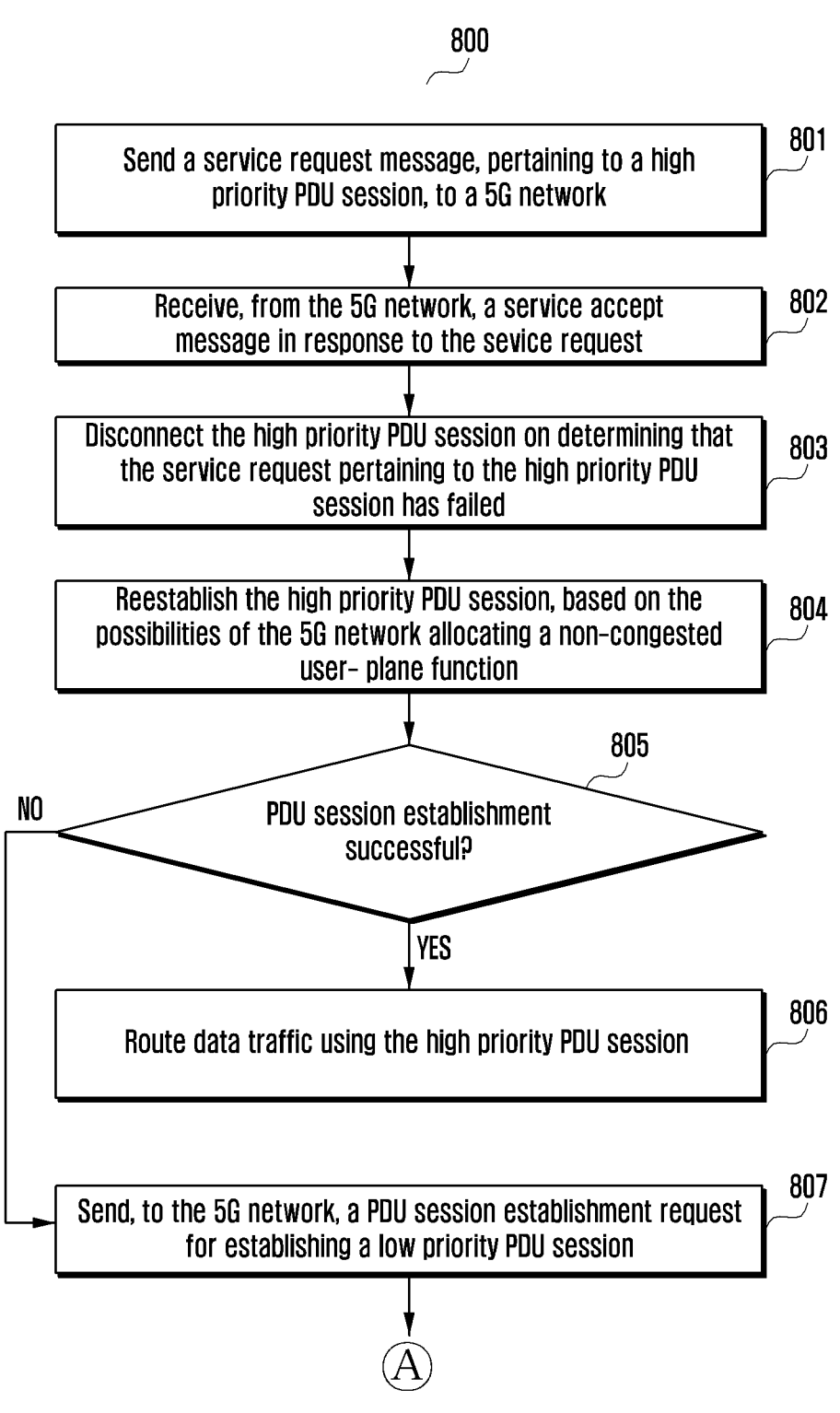
FIGS. 8A-8C are flowcharts depicting another method for preventing or reducing interruptions in user service due to issues in the 5G network, and ensuring continuity of data traffic, according to example embodiments.
Figure 8B:
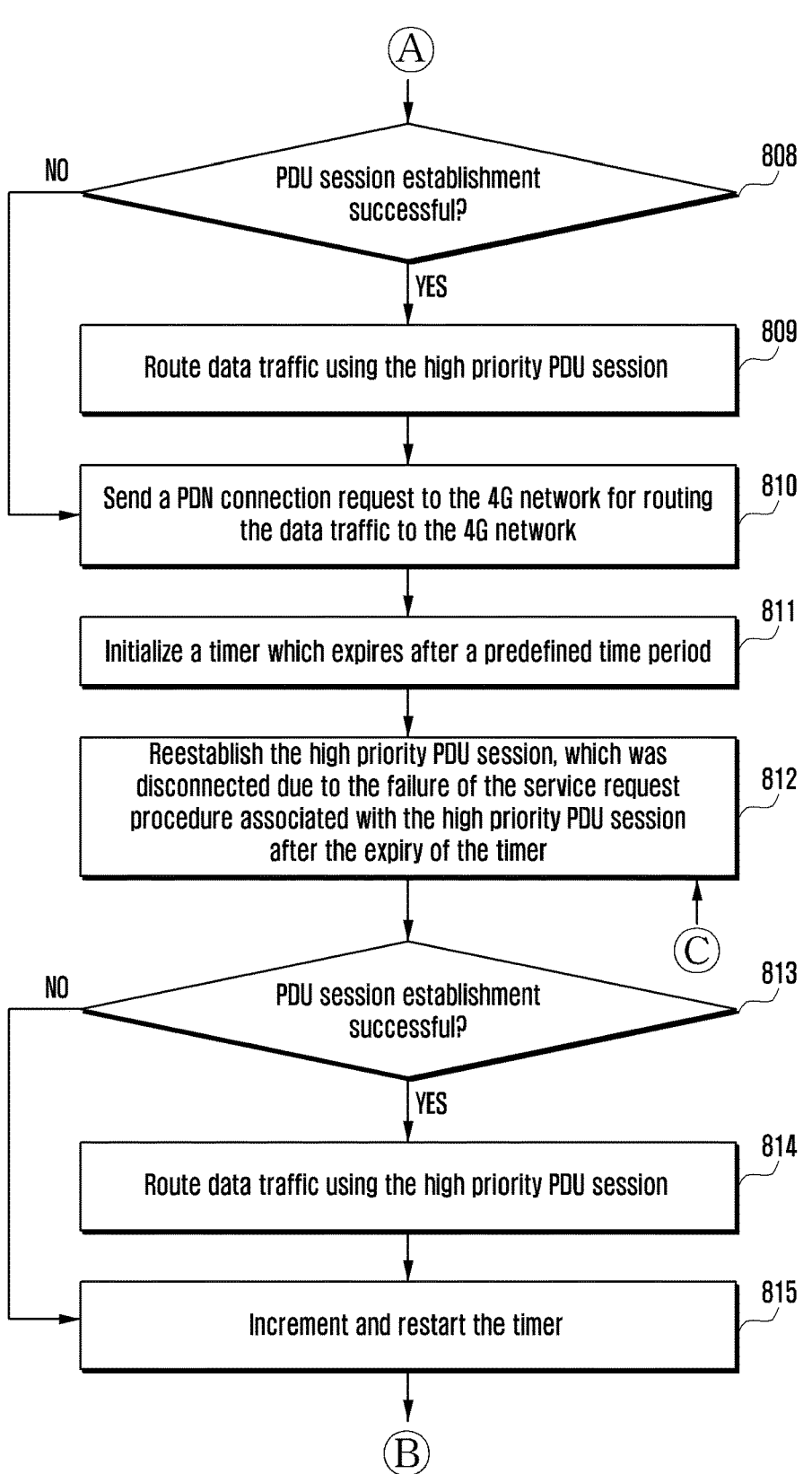
Figure 8C:
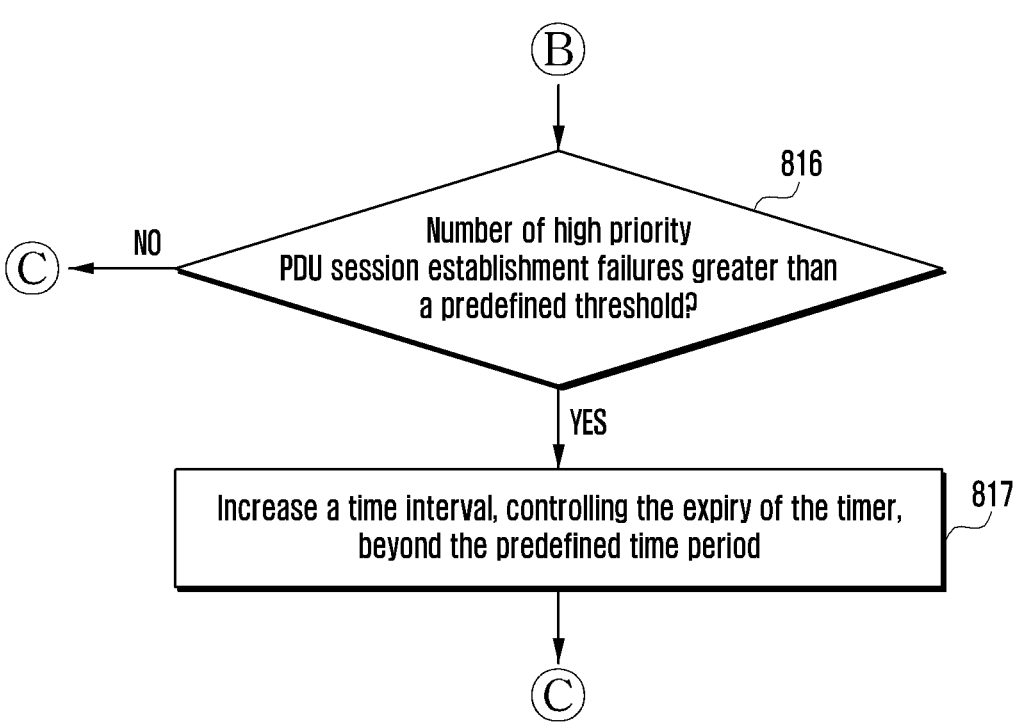

FIG. 8a, FIG. 8b and FIG. 8c are a flowchart 800 depicting another method for preventing or reducing interruptions in user service due to issues in the 5G network 602, and ensuring continuity of data traffic, according to example embodiments. At step 801, the method includes sending a service request message, pertaining to a high priority PDU session, to the 5G network 602. Consider that the PDU session is having the highest priority for routing the data traffic, and the high priority PDU session is matching with at least one route selection descriptor applicable to the data traffic. The embodiments include sending the service request message for reestablishing user-plane resources pertaining to the high priority PDU session, for reactivating the high priority PDU session.

At step 802, the method includes receiving, from the 5G network 602, a service accept message in response to the service request, which indicates failure of the service request procedure. In an embodiment, the Service Accept message can include a cause of the failure in reactivating the user-plane resources of the high priority PDU session. In an embodiment, the cause can be insufficient user-plane resources for the high priority PDU session. The cause can be indicated through a value included in the service accept message.

At step 803, the method includes closing the high priority PDU session on determining that the service request pertaining to the high priority PDU session has failed. For non-CIoT devices, the method includes, at step 804, reestablishing the high priority PDU session, based on the possibilities of the 5G network 602 allocating a non-congested user-plane function. At step 805, the method includes determining whether the high priority PDU session has been established successfully. If the high priority PDU session has been established successfully, the method includes, at step 806 routing the data traffic using the high priority PDU session.

On the other hand, if the high priority PDU session has not been established successfully, the method includes, at step 807, sending, to the 5G network 602, a PDU session establishment request for establishing a low priority PDU session with a different DNN and a different network slice, which are having lower priorities. The low priority PDU session is matching with the at least one route selection descriptor applicable to the data traffic to be routed using the low priority PDU session. If the user-plane resources are not reactivated for the high priority PDU session, by the 5G network 602, the embodiments include sending the PDU session establishment request for establishing the low priority PDU session.

At step 808, the method includes determining whether the low priority PDU session has been established successfully. If the low priority PDU session has been established successfully, the method includes, at step 809 routing the data traffic through the low priority PDU session. On the other hand, if the low priority PDU session has not been established successfully, the method includes, at step 810, sending a PDN connection request to the 4G network 603 for routing the data traffic to the 4G network 603.

At step 811, the method includes include initializing a timer, which expires after a predefined time period. At step 812, the method includes reestablishing the high priority PDU session, which was disconnected due to the failure of the service request procedure associated with the high priority PDU session. The embodiments include attempting at establishing the PDU session while the data traffic is routed seamlessly through the low priority PDU session or the 4G network 603. The embodiments include sending PDU session establishment requests for establishing the high priority PDU session after the expiry of the timer.

At step 813, the method includes determining whether the high priority PDU session has been successfully established. If the high priority PDU session has been established successfully, the method includes, at step 814, routing the data traffic through the high priority PDU session. When the high priority PDU session is successfully established, the embodiments include disconnecting the low priority PDU session or disconnecting the PDN connection with the 4G network 603. On the other hand, if the high priority PDU session has not been established successfully, the method includes, at step 815, incrementing and restarting the timer.

At step 816, the method includes determining whether number of high priority PDU session establishment failures is greater than a predefined threshold. If it is determined that the number of failures is less than a predefined threshold, the embodiments continue to establish the high priority PDU session by sending, to the 5G network 602, the PDU session establishment requests after the expiry of the timer. On the other hand, if it is determined that the number of failures is greater than a predefined threshold, the method includes, at step 817, increasing a time interval, controlling the expiry of the timer, beyond the predefined time period. Thereafter, the embodiments continue to establish the high priority PDU session by sending, to the 5G network 602, the PDU session establishment requests after the expiry of the timer (step 812).

The various actions in the flowchart 800 may be performed in the order presented, in a different order, or simultaneously. Further, in some embodiments, some actions listed in FIG. 8 may be omitted.

Figure 9:
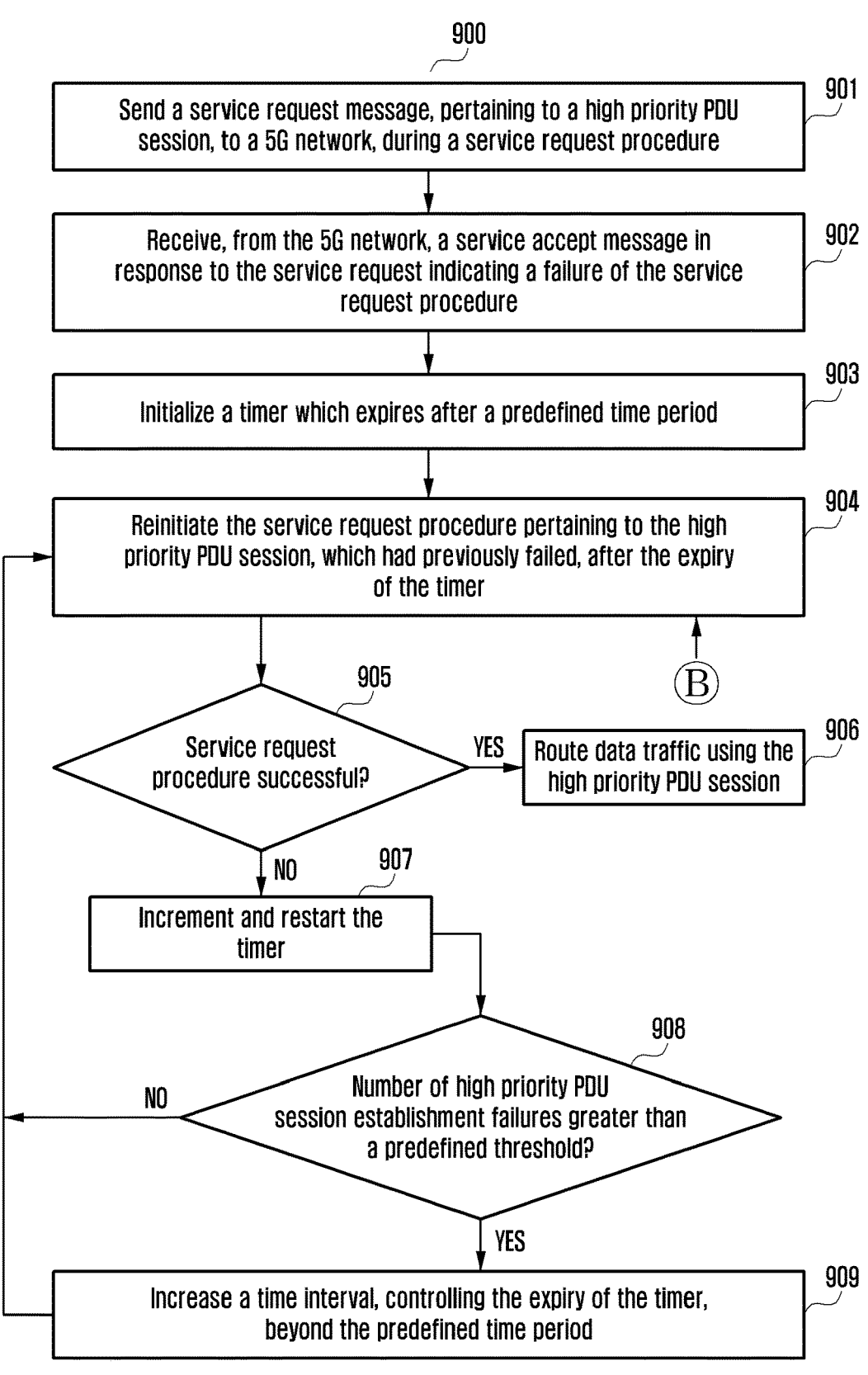
FIG. 9 is a flowchart depicting yet another method for preventing or reducing interruptions in user service due to issues in the 5G network, and ensuring continuity of data traffic, according to example embodiments.

FIG. 9 is a flowchart 900 depicting yet another method for preventing or reducing interruptions in user service due to issues in the 5G network 602, and ensuring continuity of data traffic, according to example embodiments. At step 901, the method includes sending a service request message, pertaining to a high priority PDU session, to the 5G network 602 during a service request procedure. Consider that the PDU session is having the highest priority for routing the data traffic, and the high priority PDU session is matching with at least one route selection descriptor applicable to the data traffic. The embodiments include sending the service request message for reactivating user-plane resources pertaining to the high priority PDU session, for reactivating the high priority PDU session.

At step 902, the method includes receiving, from the 5G network 602, a service accept message in response to the service request message, which indicates failure of the service request procedure. In an embodiment, the Service Accept message can include a cause of the failure in reestablishing the high priority PDU session. In an embodiment, the cause can be insufficient user-plane resources for the high priority PDU session. The cause can be indicated through a value included in the service accept message.

At step 903, the method includes, for CIoT devices, initializing a timer, which expires after a predefined time period. At step 904, the method includes reinitiating the service request procedure pertaining to the high priority PDU session, which had previously failed. The embodiments include sending a service request message to the 5G network 602 after the expiry of the timer.

At step 905, the method includes determining whether the service request procedure is successful. If the service request procedure is successful, the method includes, at step 906, routing the data traffic through the high priority PDU session. When the service request is successful and user-plane resources pertaining to the high priority PDU session have been allocated (user-plane services are resources are reactivated and the high priority PDU session is reestablished) to the high priority PDU session, the timer can be discarded.

On the other hand, if the service request procedure is not successful, the method includes, at step 907, incrementing and restarting the timer. At step 908, the method includes determining whether number of service request failures is greater than a predefined threshold. If the number of service request failures is less than the predefined threshold the embodiments continue to send the service request messages to the 5G network 602 after the expiry of the timer (step 904). On the other hand, if the number of service request failures is greater than the predefined threshold, the method includes, at step 909, increasing a time interval, controlling the expiry of the timer, beyond the predefined time period. Thereafter, the embodiments continue to send the service request messages to the 5G network 602 after the expiry of the timer (step 904).

The various actions in the flowchart 900 may be performed in the order presented, in a different order, or simultaneously. Further, in some embodiments, some actions listed in FIG. 9 may be omitted.

FIG. 10 is a flowchart 1000 depicting a method for preventing or reducing interruptions in user service due to lower layer failure in the 5G network 602, according to example embodiments. At step 1001, the method includes sending a PDU session establishment request message to the 5G network 602 for establishing a PDU session with the 5G network 602. At step 1002, the method includes receiving, from the 5G network 602, a message in response to a PDU session establishment request, which indicates that the PDU session cannot be established due to lower layer failures in the 5G network 602. At step 1003, the method includes sending a PDN connection request to the 4G network 603 for routing the data traffic using the 4G network 603. Once the PDN connection is established, the embodiments include routing the data traffic uninterruptedly through the 4G network 603. At step 1004, the method includes determining whether the lower layer failure in 5G is resolved. If the lower layer failure in the 5G network 602 has been resolved, the method includes, at step 1005, resuming data transfer through the 5G network 602 by successfully establishing a PDU session with the 5G network 602. On the other hand, if the lower layer failure in the 5G network 602 has not been resolved, the data traffic can be continued to be routed through the 4G network 603.

The various actions in the flowchart 1000 may be performed in the order presented, in a different order, or simultaneously. Further, in some embodiments, some actions listed in FIG. 10 may be omitted.

Each embodiment herein may be used in combination with any other embodiment described herein.

Figure 11:
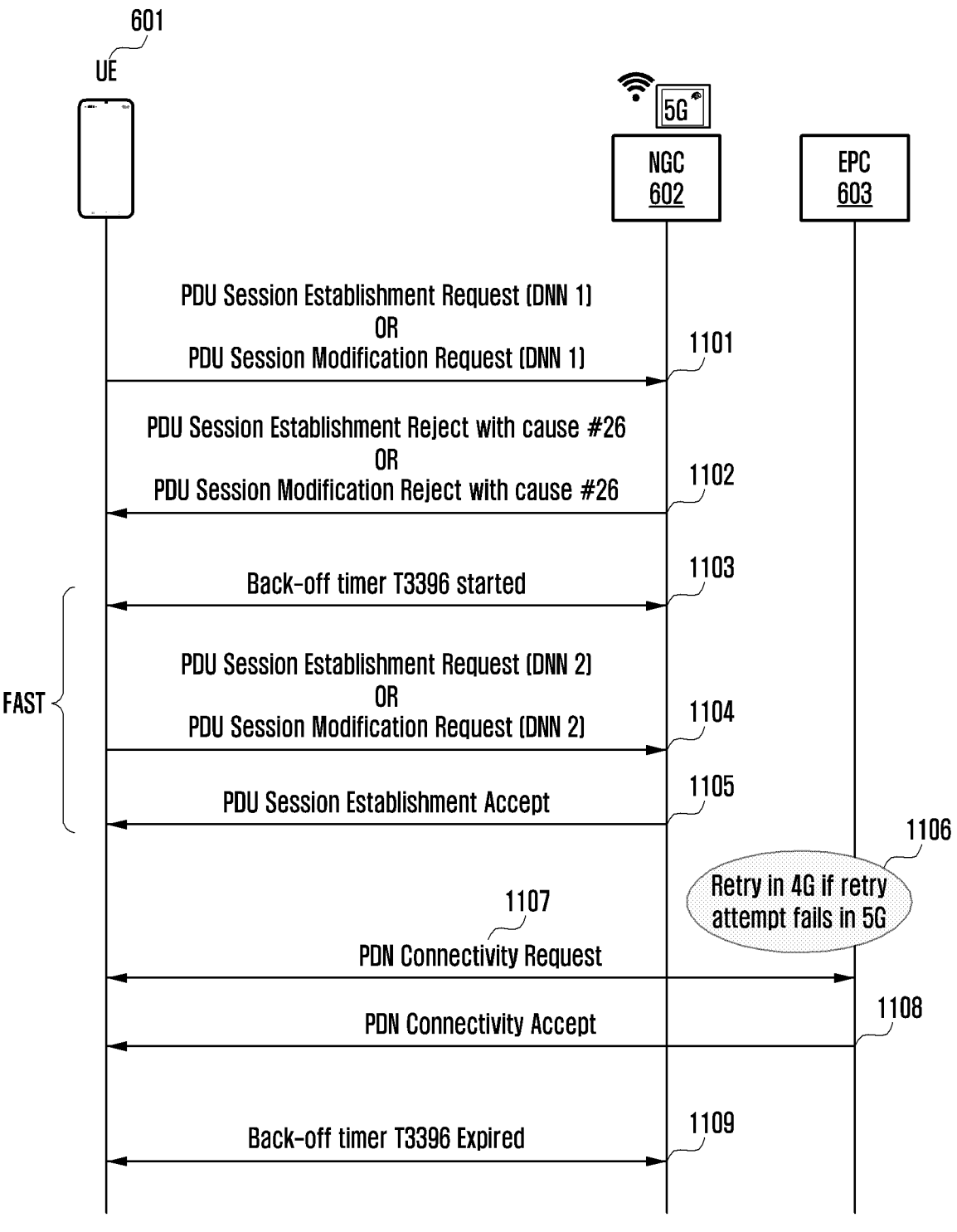
FIG. 11 is an example sequence diagram depicting the establishment of a PDU session with an alternative Data Network Name (DNN), due to congestion in a DNN of the 5G network, according to example embodiments.

FIG. 11 is an example sequence diagram depicting the establishment of a PDU session with an alternative DNN, due to congestion in a DNN of the 5G network 602, according to example embodiments. As depicted in FIG. 11, the UE 601, in process 1101, sends, to the 5G network 602 (New Radio Core (NGC)), a PDU session Establishment Request, or a PDU session Modification Request, with a DNN-1 and a network slice (not shown/specified) for routing data traffic. The PDU session with the DNN-1 is matching with at least one route selection descriptor applicable to the data traffic. UE 601 can select DNN-1 to be connected with UE 601 by referring the at least one route selection descriptor in the URSP rule. If the DNN-1 is congested (irrespective of the network slice), the 5G network 602, in process 1102, sends a PDU session Establishment Reject message or a PDU session Modification Reject message as a response. The PDU session Establishment Reject message or the PDU session Modification Reject message can include a 5G Session Management (5GSM) cause value #26 with a back-off timer T3396. The 5G network 602, in process 1103, initializes the T3396 timer to prevent or reduce the likelihood of the UE 601 sending another PDU session Establishment Request, or another PDU session Modification Request prior to the expiry of the timer T3396.

Therefore, the UE 601 is restricted by the T3396 timer from sending PDU session Establishment Requests or the PDU session Modification Requests with DNN-1 for a predefined time period. Meanwhile, the UE 601, in process 1104, sends a PDU establishment request message with DNN-2, to the 5G network 602, for routing the data traffic. UE 601 can select DNN-2 to be connected with UE 601 by referring the at least one route selection descriptor in the URSP rule. The PDU session with the DNN-2 is matching with the at least one route selection descriptor applicable to the data traffic. The 5G network 602, in process 1105, sends a PDU session Establishment Accept message, if the PDU establishment request is successful, e.g., there are no issues (such as congestion and insufficient resources) with the DNN-2. The UE 601 can route data traffic using the PDU session with the DNN-2.

If the UE 601 is not able to establish a PDU session with the 5G network 602 (process 1106), the UE 601, in process 1107, can send a PDN connectivity request message to the 4G network 603 (Evolved Packet Core (EPC)). If the 4G network 603 accepts the PDN connectivity request, the 4G network 603, in process 1108, can send a PDN connectivity accept message to the UE 603. Thereafter, the UE 603 can route data traffic to the 4G network 603.

Thus, the user services are not interrupted due to the restriction enforced by the timer T3396 on the UE 601. The priority of the DNN-1 is greater than that of the DNN-2. Therefore, once the T3396 timer expires (in process 1109), the UE 601 resends a PDU session Establishment Request or a PDU session Modification Request with the DNN-1. Similarly, the priority of 5G connectivity is greater than the priority of 4G connectivity. Therefore, the UE 601 periodically sends PDU session Establishment Request messages to the 5G network 602 with the DNN-1. If the PDU session Establishment Request is successful, the UE 601 can initiate data transfer using the PDU session with the DNN-1. The data traffic to be transmitted to 4G network 603 or to be received from 4G network 603 can be off-loaded.

Figure 12:
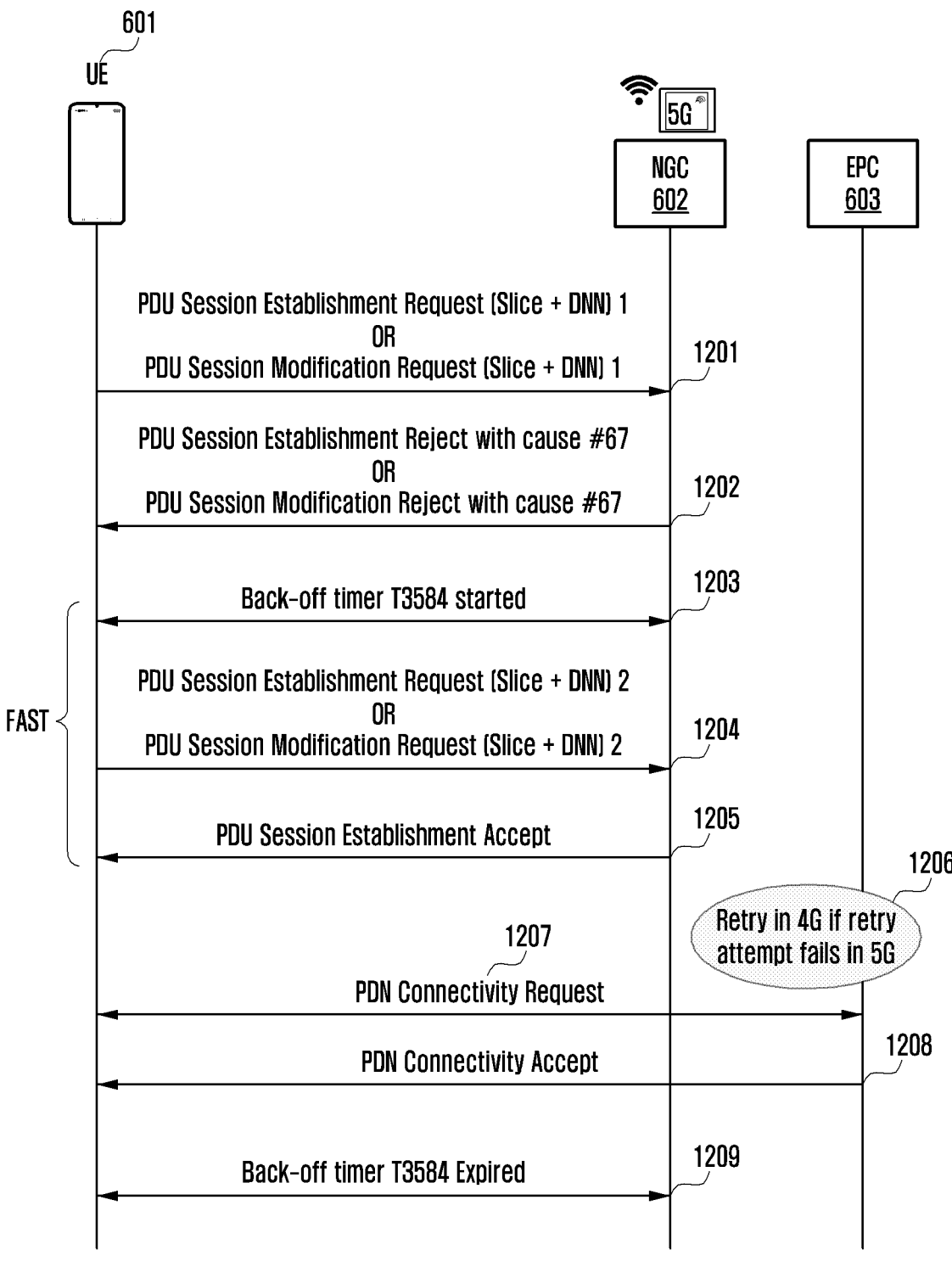
FIG. 12 is an example sequence diagram depicting the establishment of a PDU session with an alternative DNN and an alternative network slice, due to congestion in a DNN and a network slice, according to example embodiments.

FIG. 12 is an example sequence diagram depicting the establishment of a PDU session with an alternative DNN and an alternative network slice, due to congestion in a DNN and a network slice, according to example embodiments. As depicted in FIG. 12, the UE 601, in process 1201, sends a PDU session Establishment Request, or a PDU session Modification Request, with DNN-1 and network slice-1, to the 5G (NGC) network 602 for routing data traffic. UE 601 can select DNN-1 to be connected with UE 601 by referring the at least one route selection descriptor in the URSP rule. The PDU session with the DNN-1 and network slice-1 is matching with the at least one route selection descriptor applicable to the data traffic. If there is congestion in DNN-1 and network slice-1, the 5G network 602, in process 1202, sends, to the UE 601, a PDU session Establishment Reject message or a PDU session Modification Reject message. The congestion can create a scarcity of resources in the 5G network, which prevents or reduces the likelihood of establishing the PDU session with the DNN-1 and the network slice-1. The PDU session Establishment Reject message or PDU session Modification Reject message includes the 5GSM cause value #67 with a back-off timer T3584. The 5G network 602, in process 1203, initializes the T3584 timer to prevent or reduce the likelihood of the UE 601 sending another PDU session Establishment Request, or another PDU session Modification Request with the DNN-1 and the network slice-1, prior to the expiry of the timer T3584.

Therefore, the UE 601 is restricted by the T3584 timer from sending PDU session Establishment Requests or the PDU session Modification Requests with DNN-1 and network slice-1 for a predefined time period. Meanwhile, the UE 601, in process 1204, sends a PDU establishment request message with DNN-2 and network slice-2, to the 5G network 602, for routing the data traffic. UE 601 can select DNN-2 to be connected with UE 601 by referring the at least one route selection descriptor in the URSP rule. The PDU session with the DNN-2 and network slice-2 is matching with the at least one route selection descriptor applicable to the data traffic. The 5G network 602, in process 1205, sends a PDU session Establishment Accept message, if the PDU establishment request is successful and there are no issues with the DNN-2 and the network slice-2. The UE 601 can route data traffic using the PDU session with DNN-2 and the network slice-2.

If the UE 601, in process 1206, is not able to establish a PDU session with the 5G network 602, the UE 601, in process 1207, can send a PDN connectivity request message to the 4G network 603 (EPC). If the 4G network 603 accepts the PDN connectivity request, the 4G network 603, in process 1208, can send a PDN connectivity accept message. Thereafter, the UE 603 can route data traffic to the 4G network 603.

Thus, the user services are not interrupted due to the restriction enforced by the timer T3584 on the UE 601. The priority of DNN-1 is greater than that of DNN-2 and the priority of the network slice-1 is greater than that of the network slice-2. Therefore, after the expiry of the T3584 timer (process 1209), the UE 601 resends a PDU session Establishment Request or a PDU session Modification Request with the DNN-1 and the network slice-1. Similarly, the priority of 5G connectivity is greater than the priority of 4G connectivity. Therefore, the UE 601 periodically sends PDU session Establishment Request messages to the 5G network 602 with the DNN-1 and the network slice-1. If the PDU session Establishment Request is successful, the UE 601 can initiate data transfer using the PDU session with the DNN-1 and the network slice-1. The data traffic to be transmitted to 4G network 603 or to be received from 4G network 603 can be off-loaded.

Figure 13:
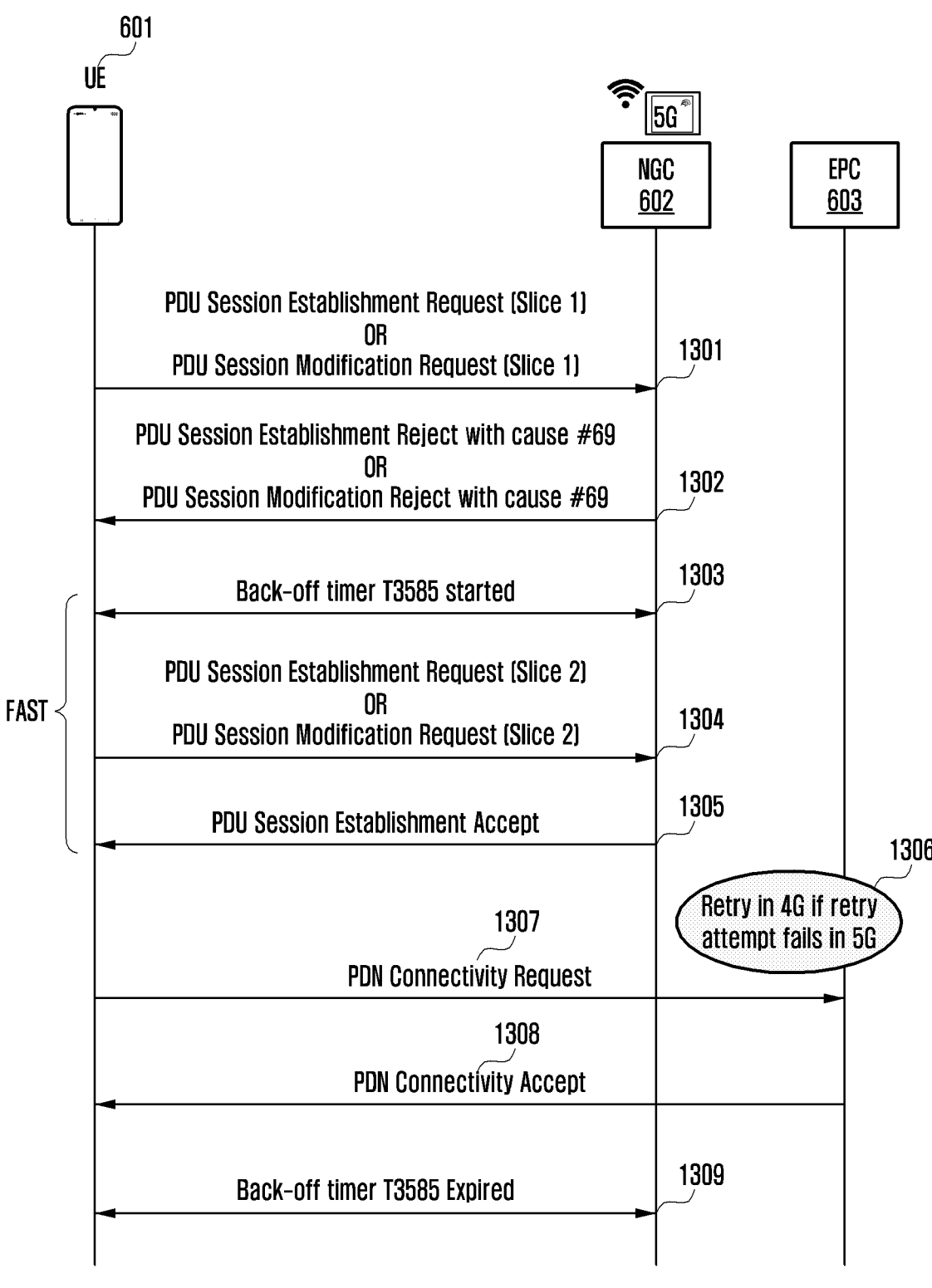
FIG. 13 is an example sequence diagram depicting the establishment of a PDU session with an alternative network slice, due to congestion in a network slice, according to example embodiments.

FIG. 13 is an example sequence diagram depicting the establishment of a PDU session with an alternative network slice, due to congestion in a network slice, according to example embodiments. As depicted in FIG. 13, the UE 601, in process 1301, sends a PDU session Establishment Request, or a PDU session Modification Request, through a particular DNN and a network slice-1, to the 5G (NGC) network for routing data traffic. UE 601 can select DNN-1 to be connected with UE 601 by referring the at least one route selection descriptor in the URSP rule. The PDU session with the network slice-1 is matching with at least one route selection descriptor applicable to the data traffic. If there is congestion in the network slice-1, the 5G network 602, in process 1302, sends, to the UE 601, a PDU session Establishment Reject message or a PDU session Modification Reject message. The congestion in the 5G network 602 prevents or reduces the likelihood of establishing the PDU session with the network slice-1. The PDU session Establishment Reject message or PDU session Modification Reject message includes the 5GSM cause value #69 with a back-off timer T3585. The 5G network 602, in process 1303, initializes the T3585 timer to prevent or reduces the chances of the UE 601 from sending further PDU session Establishment Requests or PDU session Modification Requests with the network slice-1, prior to the expiry of the timer T3585.

Therefore, the UE 601 is restricted by the T3585 timer from sending PDU session Establishment Requests or the PDU session Modification Requests with network slice-1 for a predefined time period. Meanwhile, the UE 601, in process 1304, sends a PDU establishment request message with a particular DNN and network slice-2, to the 5G network 602, for routing the data traffic. UE 601 can select DNN-2 to be connected with UE 601 by referring the at least one route selection descriptor in the URSP rule. The PDU session with the network slice-2 is matching with at least one route selection descriptor applicable to the data traffic. The 5G network 602, in process 1305, sends a PDU session Establishment Accept message, if the PDU establishment request is successful and there are no issues with the network slice-2. The UE 601 can route data traffic using the PDU session with the particular DNN and the network slice-2.

If the UE 601 is not able to establish a PDU session with the 5G network 602 (process 1306), the UE 601, in process 1307, can send a PDN connectivity request message to the 4G network 603 (EPC). If the 4G network 603 accepts the PDN connectivity request, the 4G network 603, in process 1308, can send a PDN connectivity accept message. Thereafter, the UE 603 can route data traffic to the 4G network 603.

Thus, the user services are not interrupted due to the restriction enforced by the timer T3585 on the UE 601. The priority of the network slice-1 is greater than that of the network slice-2. Therefore, after the expiry of the T3585 timer (process 1309), the UE 601 resends a PDU session Establishment Request or a PDU session Modification Request with the network slice-1. Similarly, the priority of 5G connectivity is greater than the priority of 4G connectivity. Therefore, the UE 601 periodically sends PDU session Establishment Request messages to the 5G network 602 with the network slice-1. If the PDU session Establishment Request is successful, the UE 601 can initiate data transfer using the PDU session with the network slice-1. The data traffic to be transmitted to 4G network 603 or to be received from 4G network 603 can be off-loaded.

Figure 14:
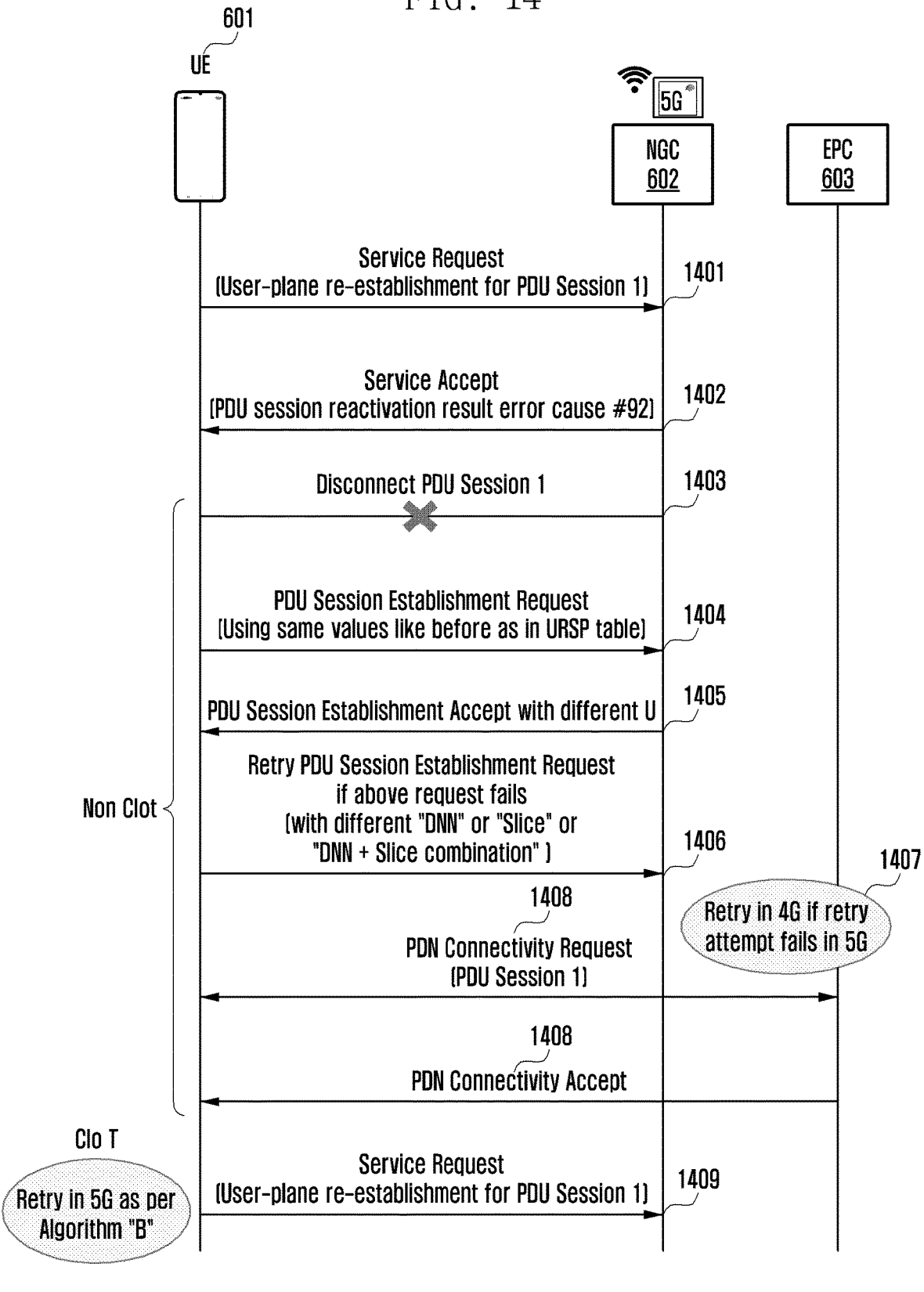
FIG. 14 is an example sequence diagram depicting the reactivation of user-plane resources associated with a PDU session, by reestablishing the PDU session, for routing data traffic, according to example embodiments.

FIG. 14 is an example sequence diagram depicting the reactivation of user-plane resources associated with a PDU session, by reestablishing the PDU session, for routing data traffic, according to example embodiments. As depicted in FIG. 14, consider that the UE 601, in process 1401, sends a service request for reactivating user-plane resources. The service request pertains to the PDU session. The service request message is received by the 5G network 603 (NGC). If the 5G network is not having sufficient user-plane resources for reactivating the user-plane resources, then the 5G network 602 in process 1402, sends, to the UE 601, a service accept message. The Service Accept message indicates a failure of the service request procedure. The cause of failure of the service request procedure is insufficient user-plane resources. In an embodiment, the Service Accept message includes the 5G Mobility Management (5GMM) cause value #92.

The UE 601 (non-CIoT device), in process 1403, can disconnect the PDU session and re-establish the PDU session. The UE 601, in process 1404, can send a PDU session establishment request to the 5G network 602. If the PDU session establishment request is successful, the PDU session is re-established with different user-plane resources. The 5G network 602, in process 1405, indicates that the success of the PDU session establishment request by sending a PDU session establishment accept message to the UE 601. If the PDU session establishment request is not successful, the UE 601, in process 1406, can attempt to establish PDU sessions with different combinations of available DNNs and network slices. If the UE 601 is not able to establish a PDU session with the 5G network (process 1407), the UE 601, in process 1408, can send a PDN connectivity request to the 4G network 603 (EPC) for establishing a PDN session for routing data traffic using user-plane resources of the 4G network 603.

The CIoT devices, in process 1409, periodically send service requests to the 5G network 602 for reactivating the user-plane resources pertaining to the PDU session.

Figure 15:
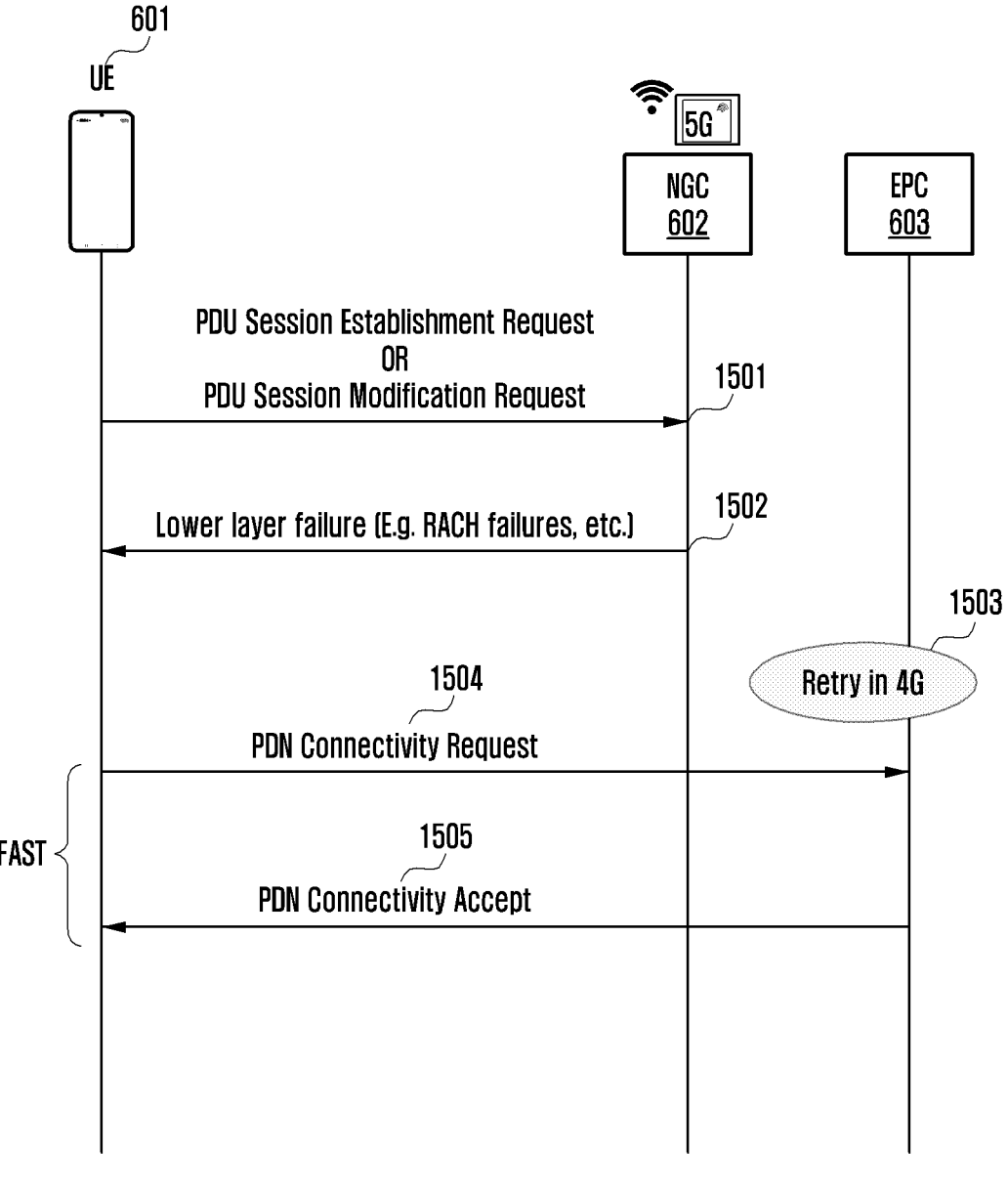
FIG. 15 is an example sequence diagram depicting the establishment of a Packet Data Network (PDN) session with the 4G network, due to 5G lower layer failure, according to example embodiments.

FIG. 15 is an example sequence diagram depicting the establishment of a PDN session with the 4G network 603 due to 5G lower layer failure, according to example embodiments. As depicted in FIG. 15, the UE 601, in process 1501, sends a PDU session Establishment Request, or a PDU session Modification Request to the 5G network 602 (NGC). If there is a lower layer failure in 5G, the UE 601, in process 1502, can detect the lower layer failure during Radio Resource Control (RRC) connection establishment, which is mandatory for sending the PDU session establishment Request or PDU session Modification Request message to the 5G network 602. The lower layer failure prevents or reduces establishing the PDU session with a particular DNN or a particular network slice, causing interruption in the delivery of user services. The lower layer failure may persist for an indefinite time period. The UE 601, in process 1504, can send a PDN connectivity request message to the 4G network 603 (EPC) when the UE 601 determines to retry a connection with 4G network 603 (process 1503). If the 4G network 603 accepts the PDN connectivity request, the 4G network 603, in process 1505, can send a PDN connectivity accept message. The UE 603 can route data traffic to the 4G network 603.

The embodiments disclosed herein can be implemented through at least one software program running on at least one hardware device and performing network management functions to control the network elements. The network elements shown in FIG. 6 include blocks which can be at least one of a hardware device, or a combination of hardware device and software module.

The embodiments disclosed herein describe methods and systems for preventing or reducing interruption of user services and ensuring continuity of data traffic, in face of congestion, insufficient user-plane resources, and/or lower layer failures, in a 5G network. Therefore, it is understood that the scope of the protection is extended to such a program and in addition to a computer readable means having a message therein, such computer readable storage contain program code means for implementation of one or more steps of the method, when the program runs on a server or mobile device or any suitable programmable device. The method is implemented in a preferred embodiment through or together with a software program written in example Very high speed integrated circuit Hardware Description Language (VHDL), or any other programming language, or implemented by one or more VHDL or several software modules being executed on at least one hardware device. The hardware device can be any kind of portable device that can be programmed. The device may also include means, which could be, for example, hardware, for example, an Application-specific Integrated Circuit (ASIC), or a combination of hardware and software, for example, an ASIC and a Field Programmable Gate Array (FPGA), or at least one microprocessor and at least one memory with software modules located therein. The method embodiments described herein could be implemented partly in hardware and partly in software. Alternatively, example embodiments may be implemented on different hardware devices, e.g. using a plurality of Central Processing Units (CPUs). Each module herein may comprise circuitry.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. User Equipment (UE) for managing data flow in a 5th Generation (5G) network, the UE comprising:
    memory configured to store a UE Route Selection Policy (URSP) rule,
    communication circuitry configured to communicate with at least one of a 5G network and an LTE network,
    a processor comprising processor circuitry operatively associated with the communication circuitry and configured to:
        receive a message, from the 5G network, in response to a Protocol Data Unit (PDU) session establishment request, wherein the message indicates a failure to establish a first PDU session with at least one of a first Data Network Name (DNN) and a first network slice, and wherein the message includes information for indicating a time instance of expiry of a timer; and
        establish a second PDU session with at least one of a second DNN being different from the first DNN and a second network slice being different from the first network slice, based on data traffic to be routed through the PDU session matching with at least one route selection descriptor associated with at least one of the second DNN and the second network slice before the timer is expired.

2. The UE of claim 1, wherein the processor is further configured to scan a plurality of DNNs and a plurality of network slices based on at least one route selection descriptor of the PDU, the at least one route selection descriptor included in the URSP rule.

3. The UE of claim 1, wherein the message to be received from the 5G network comprises a PDU session establishment reject message including a cause of the failure, wherein the cause comprises at least one of: insufficient resources in the first DNN, insufficient resources in the first DNN and the first network slice, and insufficient resources in the first network slice.

4. The UE of claim 3, wherein the PDU session establishment reject message includes a time period for indicating a time instance of expiry of a timer, wherein the PDU session with at least one of the second DNN and the second network slice is to be established prior to the expiry of the timer.

5. The UE of claim 1, wherein the processor is further configured to:
    re-establish a PDU session with at least one of the first DNN and the first network slice after the expiry of the timer,
    disconnect the PDU session with at least one of the second DNN and the second network slice when the PDU session with at least one of the first DNN and the first network slice is established.

6. The UE of claim 5, wherein a priority associated with the first DNN is greater than a priority associated with the second DNN, wherein a priority associated with the first network slice is greater than a priority associated with the second network slice.

7. The UE of claim 1, wherein the processor is further configured to: establish a Packet Data Network (PDN) connection with an Evolved Packet Core (EPC) for routing the data traffic, when the PDU session is not matching with the at least one route selection descriptor applicable to the data traffic to be routed through the PDU session.

8. The UE of claim 7, wherein a PDU session establishment reject message further includes a time period for indicating a time instance of expiry of a timer, wherein the PDN connection with the EPC is established prior to the expiry of the timer.

9. The UE of claim 8, wherein the processor is further configured to establish a PDU session with at least one of the first DNN and the first network slice after the expiry of the timer, and disconnect the PDN connection with the EPC based on the PDU session with at least one of the first DNN and the first network slice being established.

10. A method for managing data flow in a 5th Generation (5G) network, the method comprising:

receiving, by a User Equipment (UE), a message, from the 5G network, in response to at least a Protocol Data Unit (PDU) session establishment request, wherein the message indicates a failure to establish a first PDU session with at least one of a first Data Network Name (DNN) and a first network slice and includes information for indicating a time instance of expiry of a timer; and establishing, at least by the UE, a second PDU session with at least one of a second DNN being different from the first DNN and a second network slice being different from the first network slice, based on data traffic to be routed through the PDU session matching with at least one route selection descriptor associated with at least one of the second DNN and the second network slice before the timer is expired.

11. The method of claim 10, wherein the UE scans a plurality of DNNs and a plurality of network slices based on at least one route selection descriptor of the PDU.

12. The method of claim 10, wherein the message received from the 5G network comprises a PDU session establishment reject message including a cause of the failure, wherein the cause is at least one of: insufficient resources in the first DNN, insufficient resources in the first DNN and the first network slice, and insufficient resources in the first network slice.

13. The method of claim 12, wherein the method further comprises: establishing a PDU session with at least one of the first DNN and the first network slice after the expiry of the timer; and disconnecting the PDU session with at least one of the second DNN and the second network slice based on establishment of the PDU session with at least one of the first DNN and the first network slice, wherein a priority associated with the first DNN is greater than a priority associated with the second DNN.

14. The method of claim 13, wherein a priority associated with the first network slice is greater than a priority associated with the second network slice.

15. The method of claim 13, wherein the method further comprises establishing a Packet Data Network (PDN) connection with an Evolved Packet Core (EPC) for routing the data traffic, based on the PDU session not matching with the at least one route selection descriptor applicable to the data traffic to be routed through the PDU session, wherein the UE is dual registered.

* * * * *